United States Patent
Yao et al.

(10) Patent No.: US 11,100,405 B1
(45) Date of Patent: *Aug. 24, 2021

(54) SYSTEMS AND METHODS FOR COHORT IDENTIFICATION AND REPORTING

(71) Applicant: Google Inc., Mountain View, CA (US)

(72) Inventors: Jin Yao, San Jose, CA (US); Andrew Baldwin, Santa Clara, CA (US); Calvin Lee, Mountain View, CA (US); Hui Sok Moon, San Jose, CA (US); Hetal Thakkar, Sunnyvale, CA (US)

(73) Assignee: Google LLC, Mountain View, CA (US)

(*) Notice: Subject to any disclaimer, the term of this patent is extended or adjusted under 35 U.S.C. 154(b) by 1380 days.

This patent is subject to a terminal disclaimer.

(21) Appl. No.: 15/265,632

(22) Filed: Sep. 14, 2016

Related U.S. Application Data

(63) Continuation of application No. 13/911,879, filed on Jun. 6, 2013, now Pat. No. 9,454,726.

(51) Int. Cl.
G06N 5/02 (2006.01)
(52) U.S. Cl.
CPC ...................... G06N 5/02 (2013.01)
(58) Field of Classification Search
None
See application file for complete search history.

(56) References Cited

U.S. PATENT DOCUMENTS

| 5,754,938 A | 5/1998 | Herz et al. |
| 7,917,376 B2 | 3/2011 | Bellin et al. |
| 2005/0027712 A1 | 2/2005 | Gargi et al. |
| 2007/0219974 A1* | 9/2007 | Chickering ............ G06Q 10/10 |
| 2008/0005736 A1* | 1/2008 | Apacible ................ G06N 20/00 718/100 |
| 2009/0037236 A1 | 2/2009 | Miller et al. |
| 2009/0070412 A1 | 3/2009 | D'Angelo et al. |
| 2012/0131484 A1 | 5/2012 | Neumann et al. |

OTHER PUBLICATIONS

Notice of Allowance on U.S. Appl. No. 13/911,879 dated Jul. 14, 2016.
Office Action on U.S. Appl. No. 13/911,879 dated Mar. 24, 2015.
Office Action on U.S. Appl. No. 13/911,879 dated Aug. 7, 2015.
Stride Cohort Discovery Tool User Guide, retrieved from URL: https://clinicalinformatics.stanford.edu/services/cohortug.html on Apr. 17, 2013, 12 pages.

* cited by examiner

Primary Examiner — Ben M Rifkin
(74) Attorney, Agent, or Firm — Foley & Lardner LLP

(57) ABSTRACT

Systems and methods for defining a custom segment in a set of behavioral data are provided. A described method includes receiving a set of behavioral data associated with a plurality of user devices and identifying multiple cohort groups, each of the cohort groups including one or more of the user devices. The behavioral data includes a behavior metric for each of the user devices and the cohort groups are identified based on the behavior metric for each of the user devices. The method further comprises generating a segmentation interface including a graphical visualization of the multiple cohort groups and causing the segmentation interface to be presented via a user interface device. The method further comprises defining a custom segment of the behavioral data based on a user selection of one or more of the multiple cohort groups via the segmentation interface.

14 Claims, 10 Drawing Sheets

What is the name for this custom segment? | Retention Custom Segment | — 280

Which segment would you like to create a cohort segment with? ● Segment 1  ○ Segment 2  ○ Segment 3   — 278

User retention by day

| First launch of app | Segment 1 | | | | | | | | Segment 2 | | | | | | | | Segment 3 | | | | | | | |
|---|---|---|---|---|---|---|---|---|---|---|---|---|---|---|---|---|---|---|---|---|---|---|---|---|
| | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| ☐ Jan 1 2013 5,788 users | 35.66% | 34.25% | 27.38% | 28.44% | 20.12% | 15.66% | 21.23% | 19.78% | 35.66% | 34.25% | 27.38% | 28.44% | 20.12% | 15.66% | 21.23% | 19.78% | 35.66% | 34.25% | 27.38% | 28.44% | 20.12% | 15.66% | 21.23% | 19.78% |
| ☐ Jan 2 2013 5,984 users | 31.33% | 30.55% | 28.17% | 24.88% | 20.18% | 14.33% | 14.05% | | 31.33% | 30.55% | 28.17% | 24.88% | 20.18% | 14.33% | 14.05% | | 31.33% | 30.55% | 28.17% | 24.88% | 20.18% | 14.33% | 14.05% | |
| ☐ Jan 3 2013 6,102 users | 32.45% | 32.01% | 27.89% | 27.55% | 21.25% | 15.47% | | | 32.45% | 32.01% | 27.89% | 27.55% | 21.25% | 15.47% | | | 32.45% | 32.01% | 27.89% | 27.55% | 21.25% | 15.47% | | |
| ☐ Jan 4 2013 6,201 users | 32.75% | 29.56% | 27.11% | 30.14% | 22.01% | | | | 32.75% | 29.56% | 27.11% | 30.14% | 22.01% | | | | 32.75% | 29.56% | 27.11% | 30.14% | 22.01% | | | |
| ☐ Jan 5 2013 5,333 users | 33.22% | 29.87% | 28.47% | 27.69% | | | | | 33.22% | 29.87% | 28.47% | 27.69% | | | | | 33.22% | 29.87% | 28.47% | 27.69% | | | | |
| ☐ Jan 6 2013 5,884 users | 33.54% | 31.22% | 28.99% | | | | | | 33.54% | 31.22% | 28.99% | | | | | | 33.54% | 31.22% | 28.99% | | | | | |
| ☐ Jan 7 2013 5,776 users | 34.05% | 34.51% | | | | | | | 34.05% | 34.51% | | | | | | | 34.05% | 34.51% | | | | | | |
| ☐ Jan 8 2013 4,751 users | 34.17% | | | | | | | | 34.17% | | | | | | | | 34.17% | | | | | | | |

— 250

236, 252

Save this segment | Cancel

FIG. 5

SYSTEMS AND METHODS FOR COHORT IDENTIFICATION AND REPORTING

CROSS-REFERENCE TO RELATED PATENT APPLICATIONS

The present application is a Continuation of U.S. patent application Ser. No. 13/911,879, filed Jun. 6, 2013, entitled "SYSTEMS AND METHODS FOR COHORT IDENTIFICATION AND REPORTING," the entirety of which is incorporated herein by reference.

BACKGROUND

A mobile application is a software application designed to run on smartphones, tablet computers, and/or other mobile devices. Mobile applications have a wide variety of uses including general productivity (e.g., word processing, email, banking, etc.), information retrieval (e.g., calendar, contacts, stocks, weather, etc.), entertainment (e.g., games, Internet browsing, etc.), and location-based services (e.g., GPS, navigation, directions, etc.). Mobile applications are typically created by application developers and subsequently distributed to multiple user devices.

In statistics and demography, a "cohort" is a group of subjects who have shared a particular event together during a particular time span. In a dataset associated with a plurality of users or user devices, a cohort group may be a subset of the users or user devices represented in the dataset. For example, a cohort of user devices may include all user devices which have launched a particular application.

SUMMARY

One implementation of the present disclosure relates to an automated computer-implemented method for defining a custom segment in a set of behavioral data. The method comprises receiving, at a processing circuit, a set of behavioral data associated with a plurality of user devices. The behavioral data includes a behavior metric for each of the user devices. The method further comprises identifying, by the processing circuit, multiple cohort groups, each of the cohort groups including one or more of the user devices. The cohort groups are identified based on the behavior metric for each of the user devices. The method further comprises generating, by the processing circuit, a segmentation interface including a graphical visualization of the multiple cohort groups and causing the segmentation interface to be presented via a user interface device. Advantageously, each of the cohort groups in the segmentation interface may be presented as a selectable icon. The method further comprises receiving a user selection of one or more of the cohort groups presented via the segmentation interface by receiving a selection of one or more of the selectable icons and defining, by the processing circuit, a custom segment of the behavioral data in response to the user selection. The custom segment is a subset of the behavioral data and is associated with a subset of the user devices represented in the set of behavioral data. The method further comprises storing an indication of the custom segment in a non-volatile data storage device.

In some implementations, the method further comprises generating a reporting interface separate from the segmentation interface and causing the reporting interface to be presented via a user interface device. The reporting interface may include a selectable representation of the custom segment. In some implementations, the method further comprises retrieving the indication of the custom segment from the data storage device in response to a user selection of the selectable representation of the custom segment and applying the custom segment to a second dataset associated with a plurality of user devices. In some implementations, the method further comprises selecting a portion of the second dataset for inclusion in an analytical report. The selection may be based on the application of the custom segment. In some implementations, the method further comprises generating an analytical report using the selected portion of the second dataset. The analytical report may analyze a behavior metric other than the behavior metric used to identify the cohort groups.

In some implementations, the second dataset is one or more of: the set of behavioral data received at the processing circuit, a set of behavioral data including some of the behavioral data received at the processing circuit and some additional behavioral data, and a set of third-party behavioral data including none of the behavioral data received at the processing circuit. In some implementations, the set of behavioral data received at the processing circuit is received from the plurality of user devices.

In some implementations, the method further comprises receiving a user selection of a first behavior metric. The user selection of the first behavior metric may be non-predicated. The multiple cohort groups may be defined using the first behavior metric. In some implementations, the behavioral data includes multiple behavior metrics for each of the user devices and the method further comprises receiving a user selection of a second behavior metric. The user selection of the second behavior metric may be non-predicated. The multiple cohort groups may be defined using both the first behavior metric and the second behavior metric.

In some implementations, the behavioral data includes retention data for each of the plurality of user devices. The retention data for each user device may include a first behavior metric indicating a time at which the user device first launched an application, the time of first launch occurring within a first time period, and a second behavior metric indicating whether the user device launched the application during one or more time periods subsequent to the first time period.

In some implementations, identifying the multiple cohort groups includes identifying a plurality of discrete first-launch periods and dividing the plurality of user devices into first-launch groups. Each first-launch group may be associated with one of the first-launch periods. A user device may be assigned to a particular first-launch group if the time at which the user device first launched the application occurred during the first-launch period associated with the particular first-launch group. Identifying the multiple cohort groups may further include, for each first-launch group, identifying one or more discrete time periods which have elapsed since an end of the first-launch period associated with the first-launch group and assigning each of the user devices within the first-launch group to one or more cohort groups. Each cohort group may be associated with one of the discrete time periods. A user device may be assigned to a cohort group if the user device launched the application during the discrete time period associated with the cohort group.

Another implementation of the present disclosure is a data management system for defining a custom segment in a set of behavioral data. The data management system comprises a processing circuit configured to receive a set of behavioral data associated with a plurality of user devices. The behavioral data includes a behavior metric for each of the user devices. The processing circuit is further configured to identify multiple cohort groups, each of the cohort groups including one or more of the user devices. The cohort groups may be identified based on the behavior metric for each of the user devices. The processing circuit is further configured to generate a segmentation interface including a graphical visualization of the multiple cohort groups and cause the segmentation interface to be presented via a user interface device. Each of the cohort groups in the segmentation interface may be presented as a selectable icon. The processing circuit is further configured to receive a user selection of one or more of the cohort groups by receiving a selection of one or more of the selectable icons presented via the segmentation interface and to define a custom segment of the behavioral data in response to the user selection. The custom segment may be a subset of the behavioral data and may be associated with a subset of the user devices. The processing circuit is further configured to store an indication of the custom segment in a non-volatile data storage device.

In some implementations, the processing circuit is further configured to generate a reporting interface separate from the segmentation interface and cause the reporting interface to be presented via a user interface device. The reporting interface may include a selectable representation of the custom segment. The processing circuit is further configured to retrieve the indication of the custom segment from the data storage device in response to a user selection of the selectable representation of the custom segment, apply the custom segment to a second dataset associated with a plurality of user devices, and select a portion of the second dataset for inclusion in an analytical report. The portion of the second dataset may be selected based on the application of the custom segment. The processing circuit is further configured to generate an analytical report using the selected portion of the second dataset. The analytical report may analyze a behavior metric other than the behavior metric used to identify the cohort groups.

In some implementations, the second dataset is one or more of: the set of behavioral data received at the processing circuit, a set of behavioral data including some of the behavioral data received at the processing circuit and some additional behavioral data, and a set of third-party behavioral data including none of the behavioral data received at the processing circuit. In some implementations the set of behavioral data received at the processing circuit is received from the plurality of user devices.

In some implementations the behavioral data includes multiple behavior metrics for each of the user devices and the processing circuit is further configured to receive a user selection of a first behavior metric. The user selection of the first behavior metric may be non-predicated. The multiple cohort groups may be defined using the first behavior metric. In some implementations the processing circuit is further configured to receive a user selection of a second behavior metric. The user selection of the second behavior metric may be non-predicated. The multiple cohort groups may be defined using both the first behavior metric and the second behavior metric.

In some implementations, the behavioral data includes retention data for each of the plurality of user devices, the retention data for each user device comprising a first behavior metric indicating a time at which the user device first launched an application, the time of first launch occurring within a first time period; and a second behavior metric indicating whether the user device launched the application during one or more time periods subsequent to the first time period.

In some implementations the processing circuit is configured to identify the multiple cohort groups be performing operations comprising identifying a plurality of discrete first-launch periods and dividing the plurality of user devices into first-launch groups. Each first-launch group may be associated with one of the first-launch periods. A user device may be assigned to a first-launch group if the time at which the user device first launched the application occurred during the first-launch period associated with the first-launch group. Identifying the multiple cohort groups may further include, for each first-launch group, identifying one or more discrete time periods which have elapsed since an end of the first-launch period associated with the first-launch group and assigning each of the user devices within the first-launch group to one or more cohort groups. Each cohort group may be associated with one of the discrete time periods. A user device may be assigned to a cohort group if the user device launched the application during the discrete time period associated with the cohort group Another implementation of the present disclosure is one or more non-transitory computer-readable media having instructions stored therein, the instructions being executable by one or more processors to cause the one or more processors to perform operations comprising receiving a set of behavioral data associated with a plurality of user devices and identifying multiple cohort groups, each of the cohort groups including one or more of the user devices, based on a behavior metric for each of the user devices. The operations further comprise generating a segmentation interface including a graphical visualization of the multiple cohort groups and causing the segmentation interface to be presented via a user interface device. Each of the cohort groups in the segmentation interface may be presented as a selectable icon. The operations further comprise receiving a user selection of one or more of the cohort groups by receiving a selection of one or more of the selectable icons presented via the segmentation interface and defining a custom segment of the behavioral data in response to the user selection. The custom segment is a subset of the behavioral data and is associated with a subset of the user devices. The operations further comprise storing an indication of the custom segment in a non-volatile data storage device.

In some implementations, the operations further comprise generating a reporting interface separate from the segmentation interface and causing the reporting interface to be presented via a user interface device. The reporting interface may include a selectable representation of the custom segment. In some implementations, the operations further comprise retrieving the indication of the custom segment from the data storage device in response to a user selection of the selectable representation of the custom segment and applying the custom segment to a second dataset associated with a plurality of user devices. In some implementations, the operations further comprise selecting a portion of the second dataset for inclusion in an analytical report. The selection may be based on the application of the custom segment. In some implementations, the operations further comprise generating an analytical report using the selected portion of the second dataset. The analytical report may analyze a behavior metric other than the behavior metric used to identify the cohort groups.

In some implementations, the behavioral data includes retention data for each of the plurality of user devices, the retention data for each user device comprising a first behavior metric indicating a time at which the user device first launched an application, the time of first launch occurring within a first time period, and a second behavior metric indicating whether the user device launched the application during one or more time periods subsequent to the first time period.

In some implementations, the instructions for identifying the multiple cohort groups cause the one or more processors to perform operations comprising identifying a plurality of discrete first-launch periods and dividing the plurality of user devices into first-launch groups. Each first-launch group may be associated with one of the first-launch periods. A user device may be assigned to a first-launch group if the time at which the user device first launched the application occurred during the first-launch period associated with the first-launch group. The operations further comprise, for each first-launch group, identifying one or more discrete time periods which have elapsed since an end of the first-launch period associated with the first-launch group and assigning each of the user devices within the first-launch group to one or more cohort groups. Each cohort group may be associated with one of the discrete time periods. A user device may be assigned to a cohort group if the user device launched the application during the discrete time period associated with the cohort group Those skilled in the art will appreciate that the foregoing summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIGS. 5-6 are additional drawings of the segmentation interface generated by the data management system of FIG. 2, the segmentation interface including a graphical visualization of the multiple cohort groups which may be used for defining a custom segment (e.g., by selecting one or more of the cohort groups) and storing the custom segment in a data storage device, according to a described implementation.

DETAILED DESCRIPTION

Figure 1:
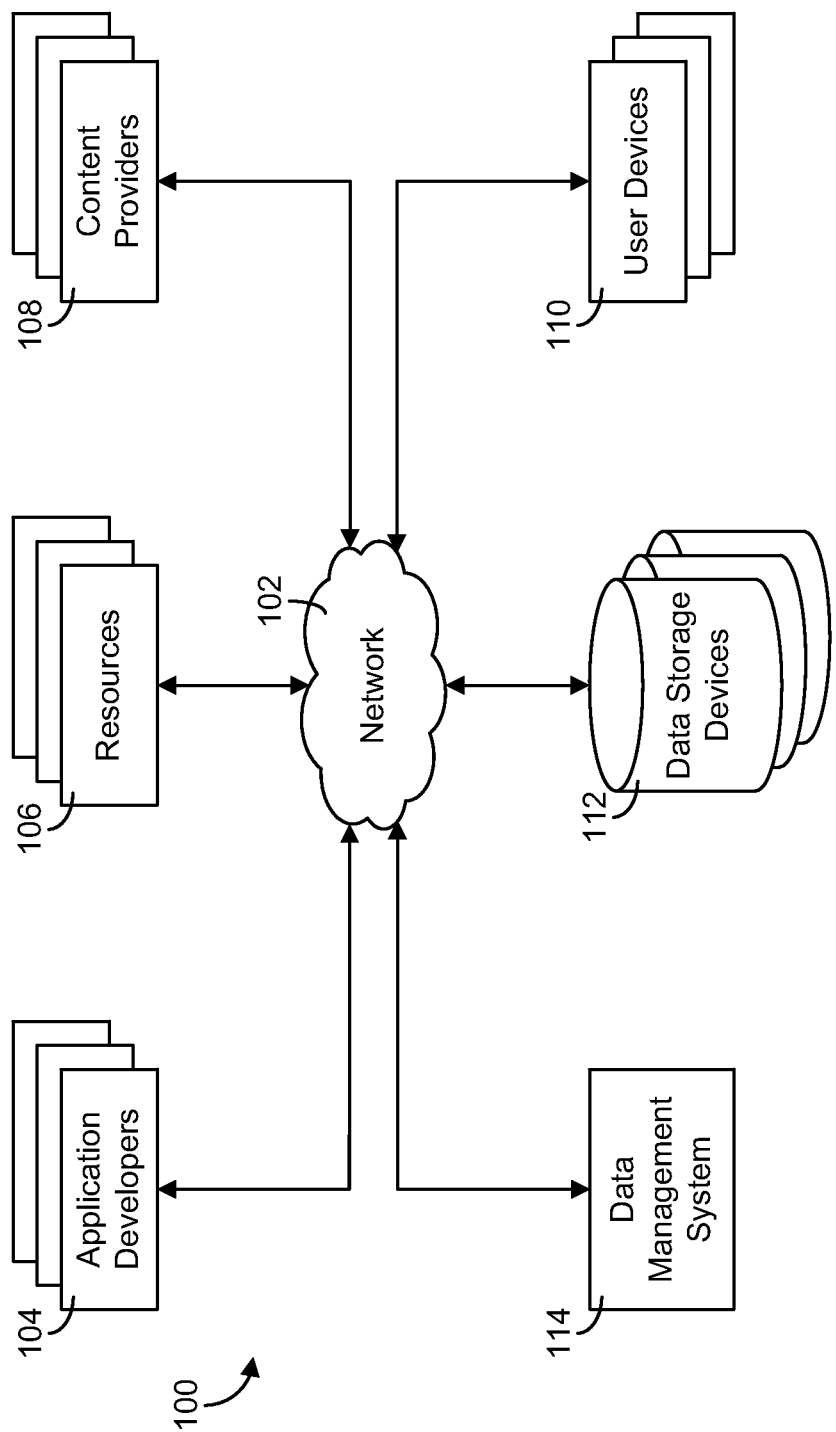
FIG. 1 is a block diagram of a computer system including a network, application developers, resources, content providers, user devices, data storage devices, and a data management system, shown according to a described implementation.

Application developers often use an analytical product to monitor and assess the performance of an application (e.g., mobile or non-mobile) once the application has been installed and launched by a user device. For example, the analytical product can be used to monitor a total number of downloads/installations, a number of repeat uses (e.g., by the same user device), and other general statistics related to a particular application and/or user device.

Current analytical products typically allow for the identification of cohort groups using predicated, preset grouping criteria. The groupings are generally predefined within the product and cannot be adjusted to fit a custom grouping definition. Additionally, once a cohort group has been identified, existing analytical products do not provide application developers with the flexibility to store the identified cohort group for subsequent use as a data filter for a different or updated dataset (e.g., other than the exact dataset used to identify the cohort group).

Referring generally to the FIGURES, systems and methods for cohort group identification and reporting are shown and described. The systems and methods described herein may be used to define a "custom segment" in a set of behavioral data and apply the custom segment as a data filter in a subsequent analytical report. Behavioral data may include any data relating to an action, a response, an interaction, a communication, a reaction, or any other behavior of a user device. Behavioral data may also include any data associated with a user device represented in the set of behavioral data. The custom segment may define a subset of the behavioral data relating to a plurality of users and/or user devices represented in the set of behavioral data. Advantageously, the custom segment may be defined through a segmentation interface including a graphical visualization of multiple cohort groups.

For example, each of the cohort groups presented via the segmentation interface may be selectable. A user (e.g., an application developer, an advertiser, a resource operator) may define the custom segment by selecting one or more of the multiple cohort groups.

In some implementations, the cohort groups may be based on a behavior metric associated with each of the user devices represented in the set of behavioral data. The behavior metric may be any attribute quantifying the behavior of a user or user device. For example, one behavior metric associated with a user device may describe time at which the user device first launched an application. In some implementations, a user device may be assigned to a particular cohort group if the time at which the user device first launched the application is within a time period associated with the particular cohort group. Advantageously, the multiple cohort groups may be defined according to user-specified grouping criteria. For example, a user may specify the behavior metric used to define the multiple cohort groups or otherwise define the multiple cohort groups according to non-predicated, customizable grouping criteria. Each of the cohort groups may then be presented visually (e.g., as selectable icons, cells, graphics, etc.) via the segmentation interface.

Advantageously, the systems and methods of the present disclosure provide multiple layers of flexibility and customizability in defining the custom segment. For example, a user may customize the cohort groups by adjusting the grouping criteria (e.g., behavior metrics, user device attributes, etc.) used to assemble the multiple cohort groups. Additionally, once the cohort groups have been identified, the user may define the custom segment by selecting a subset of the multiple cohort groups via the segmentation interface. Accordingly, the custom segment may be identified and selected from non-predicated, user-defined groupings (e.g., the user-defined cohort groups) using the visual context system provided by the segmentation interface.

In some implementations, the custom segment may be stored (e.g., in a data storage device) using the segmentation interface and subsequently retrieved via a reporting interface. The custom segment may be applied as a data filter (e.g., to select or deselect a portion of data defined by the custom segment) in an analytical report. Advantageously, the analytical report may analyze a behavior metric other than the behavior metric used to define the multiple cohort groups.

In some implementations, the systems and methods described herein may be used to generate cohort-based retention reports. For example, multiple cohort groups can be identified based on a "first launch" behavior metric describing a time at which a user device first launched an application and a "subsequent launch" behavior metric describing a time or times at which the same user device subsequently launched the application. The cohort-based retention reports created using the systems and methods of the present disclosure can be used to answer the question "for all user devices which first launched an application within time period X, how many of them subsequently launched the application Y days/weeks later?"

Referring now to FIG. 1, a block diagram of a computer system 100 is shown, according to a described implementation. In brief overview, computer system 100 is shown to include a network 102, application developers 104, resources 106, content providers 108, user devices 110, data storage devices 112, and a data management system 114. Computer system 100 may facilitate communication between application developers 104, user devices 110, and data management system 114. For example, application developers 104 may create an application for user devices 110 and distribute the application to user devices 110 via network 102. User devices 110 may launch the application and report behavioral data (e.g., usage statistics) to data management system 114. In some implementations, the behavioral data may be stored in data storage devices 112. Application developers 104 may interact with data management system 114 to select and analyze the behavioral data received from user devices 110.

Computer system 100 may also facilitate communication between content providers 108, resources 106, user devices 110, and data management system 114. For example, content providers 108 may provide various content items to data management system 114 via network 102. Data management system 114 may select content items for delivery to user devices 110 or resources 106 based on a request for content received from user devices 110 or resources 106. Content providers 108 may interact with data management system 114 to select and analyze content distribution data related to the various content items provided via data management system 114. The content distribution data may include behavioral data associated with user devices 110 (e.g., interaction with distributed content items, clicks, conversions, etc.).

Still referring to FIG. 1, and in greater detail, computer system 100 is shown to include a network 102. Network 102 may be a local area network (LAN), a wide area network (WAN), a cellular network, a satellite network, a radio network, the Internet, or any other type of data network or combination thereof. Network 102 may include any number of computing devices (e.g., computers, servers, routers, network switches, etc.) configured to transmit, receive, or relay data. Network 102 may further include any number of hardwired and/or wireless connections. For example, application developers 104 may communicate wirelessly (e.g., via WiFi, cellular, radio, etc.) with a transceiver that is hardwired (e.g., via a fiber optic cable, a CAT5 cable, etc.) to a computing device of network 102.

Still referring to FIG. 1, computer system 100 is shown to include application developers 104. Application developers 104 may create an application for distribution to user devices 110. The application may be created by generating program code and compiling the program code into an executable application (e.g., computer-executable instructions) compatible with user devices 110. Application developers 104 may create any type of application including, for example, general productivity applications (e.g., word processing, email, banking, etc.), information retrieval applications (e.g., calendar, contacts, stocks, weather, etc.), entertainment applications (e.g., games, Internet browsing, etc.), and location-based services applications (e.g., GPS, navigation, directions, etc.). The applications may be formulated to be compatible with a specific class of user devices 110 (e.g., tablet computers, desktop computers, smartphones, etc.), a specific operating system used by user devices 110, or any other criteria affecting the compatibility of the developed applications.

In some implementations, application developers 104 may create mobile applications. A mobile application may be defined as a software application designed to run on smartphones, tablet computers, and/or other mobile devices. In other words, application developers 104 may create applications which are specifically configured to be executed (e.g., launched, run, etc.) by mobile devices. In other implementations, the applications may be configured to be executed by other types of user devices 110 such as desktop computers, stationary workstations, or other types of non-mobile user devices. The applications may be configured to be compatible with mobile devices, non-mobile devices, or both mobile and non-mobile devices.

In some implementations, the applications may be configured to be executed by a web server. For example, the applications may be web-based applications presented via network 102 to user devices 110. Alternatively, the applications may be executed by the web server to measure website traffic or collect other website-related data (e.g., behavioral data associated with a particular resource, resource visits/downloads, conversions, etc.).

In some implementations, application developers 104 may create applications configured to automatically request content items (e.g., resource data, advertisements, notifications, etc.) from data management system 114 or from content providers 108. The content items may be requested by an application currently executing on user devices 110 in response to an event detected by the application. In some implementations, application developers 104 may be provided with a software development kit to assist in configuring the developed applications to automatically request content items. The software development kit may provide application developers 104 with a convenient mechanism for adapting their applications to automatically request, receive, and display various content items via user devices 110. For example, the software development kit may be configured to create a software object (e.g., a Java object, a programming object, etc.) which may be inserted into the application's program code prior to compilation. When executed by user devices 110, the software object may submit requests for content items, receive and reconfigure the content items, present the content items via a user interface element, and measure user interaction with presented content items (e.g., clicks, conversions, display time, etc.).

In some implementations, application developers 104 may create applications configured to report one or more behavior metrics to data management system 114. A behavior metric may be a measurement, a calculated value, a quantitative/numerical representation, a binary variable (e.g., true, false, on, off, yes, no, etc.), a text/numerical string, or other description of a behavior associated with a particular user device 110. For example, a "first launch" behavior metric may describe a time at which a user device first launched a particular application. A "subsequent launch" behavior metric may describe a time at which the same user device launched the same application after the initial "first launch." In some implementations, an application created by application developers 104 may be configured to report (e.g., to data management system 114) each time the application is launched by user devices 110.

Other examples of behavior metrics include quantitative descriptions of the interaction of user devices 110 with distributed content items (e.g., number of impressions, number of clicks, number of conversions, an amount spent associated with each conversion, etc.) or other metrics describing the behavior of a user device (e.g., device usage information, software configuration, user profile information, geographic location, installed applications, etc.). The behavior metrics reported to data management system 114 may be used to assign user devices 110 to one or more cohort groups.

For situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated (e.g., by data management system 114) in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, a user may have control over how information is collected (e.g., by an application, by user devices 110, etc.) and used by data management system 114.

Still referring to FIG. 1, computer system 100 is shown to include resources 106. Resources 106 may include any type of information or data structure that can be provided over network 102. In some implementations, resources 106 may be identified by a resource address associated with each resource (e.g., a uniform resource locator (URL)). Resources 106 may include web pages, word processing documents, portable document format (PDF) documents, images, video, programming elements, interactive content, streaming video/audio sources, or other types of electronic information. Resources 106 may include content (e.g., words, phrases, images, sounds, etc.) having embedded information (e.g., meta-information embedded in hyperlinks) and/or embedded instructions. Embedded instructions may include computer-readable instructions (e.g., software code, JavaScript®, ECMAScript®, etc.) which are executed by user devices 110 (e.g., by a web browser running on user devices 110).

In some implementations, resources 106 may report behavioral data including one or more behavior metrics to data management system 114. Behavioral data generated by resources 106 may include website traffic data, conversion data (e.g., conversion type, amount spent, etc.), click-through-path data (e.g., content impressions, clicks, or other interactions responsible for a conversion event), resource visit/download data, user account-related data, content item data (e.g., impressions, clicks, conversions, etc.), content selection data (e.g., content slot information, number/type of content requests, delivered content items, etc.), resource data, landing page data, or other types of data describing interactions between resources 106 and one or more of content providers 108, user devices 110, and data management system 114.

Still referring to FIG. 1, computer system 100 is shown to include content providers 108. Content providers 108 may include one or more electronic devices representing advertisers, resource operators, business owners, or other entities using the services provided by data management system 114. In some implementations, content providers 108 may produce content items for presentation to user devices 110. In other implementations, content providers 108 may submit a content generation request to data management system 114 and data management system 114 may automatically generate a content item in response to the request. The content items may be stored in one or more data storage devices local to content providers 108, within data management system 114, or in data storage devices 112.

In some implementations, the content items may be advertisements. The advertisements may be display advertisements such as image advertisements, Flash® advertisements, video advertisements, text-based advertisements, or any combination thereof. In other implementations, the content items may include other types of content which serve various non-advertising purposes. The content items may be displayed in a content slot of resources 106 and presented (e.g., alongside other resource content) to user devices 110.

Content providers 108 may submit, to data management system 114, campaign parameters that are used to control the distribution of content items to user devices 110. The campaign parameters may include keywords associated with the content items, bids corresponding to the keywords, a content distribution budget, geographic limiters, or other criteria used by data management system 114 to determine when a content item may be presented to user devices 110.

Content providers 108 may access data management system 114 to monitor the performance of the content items distributed according to the established campaign parameters. For example, content providers 108 may access data management system 114 to review one or more behavior metrics associated with a content item or set of content items. The behavior metrics may describe a behavior of user devices 110 (e.g., number of impressions, number of clicks, number of conversions, an amount spent, etc.) in response to a distributed content item. The behavior metrics reported to data management system 114 may be used to assign user devices 110 to one or more cohort groups.

Still referring to FIG. 1, computer system 100 is shown to include user devices 110. User devices 110 may include any number and/or type of user-operable electronic devices. For example, user devices 110 may include desktop computers, laptop computers, smartphones, tablets, mobile communication devices, remote workstations, client terminals, entertainment consoles, or any other devices capable of interacting with the other components of computer system 100 (e.g., via a communications interface). For example, user devices 110 may be capable of receiving content/applications via network 102, executing an application created by application developers 104, and/or reporting behavioral data to data management system 114. User devices 110 may include mobile devices or non-mobile devices.

In some implementations, user devices 110 include an application (e.g., a web browser, a resource renderer, etc.) for converting electronic content into a user-comprehensible format (e.g., visual, aural, graphical, etc.). User devices 110 may include a user interface element (e.g., an electronic display, a speaker, a keyboard, a mouse, a microphone, a printer, etc.) for presenting content to a user, receiving user input, or facilitating user interaction with an application created by application developers 104. User devices 110 may include a processor capable of executing applications created by application developers 104 and one or more memory devices capable of storing applications, content items, and other application data.

User devices 110 may report behavioral data including one or more behavior metrics to data management system 114. The behavior metrics may describe a behavior of user devices 110 with respect to applications created by application developers 104, content items created or requested by content providers 108, and/or other behavioral data associated with user devices 110. With respect to an application created by application developers 104, user devices 110 may be configured (e.g., by the application, by a user, etc.) to report to data management system 114 each time the application is launched, a time at which the application is downloaded or deleted, an amount spent associated with the application, or other usage information related the interaction between user devices 110 and the application. With respect to content items created or requested by content providers 108, user devices 110 may be configured to report to data management system 114 a number of impressions, a number of clicks, a number of conversions, an amount spent on each conversion, a conversion path, or other behavioral data related to the interaction between user devices 110 and a delivered content item. The behavior metrics reported to data management system 114 may be used to assign user devices 110 to one or more cohort groups.

Still referring to FIG. 1, computer system 100 is shown to include data storage devices 112. Data storage devices 112 may be any type of memory device capable of storing behavioral data, application data, content items, or other data used by data management system 114. Data storage devices 112 may include any type of non-volatile memory, media, or memory devices. For example, data storage devices 112 may include semiconductor memory devices (e.g., EPROM, EEPROM, flash memory devices, etc.) magnetic disks (e.g., internal hard disks, removable disks, etc.), magneto-optical disks, and/or CD-ROM and DVD-ROM disks. In some implementations, data storage devices 112 may be local to data management system 114, application developers 104, or content providers 108. In other implementations, data storage devices 112 may be remote data storage devices connected with data management system 114 via network 102.

Still referring to FIG. 1, computer system 100 is shown to include a data management system 114. Data management system 114 may receive a set of behavioral data associated with user devices 110. The behavioral data may be received from user devices 110 and may include one or more behavior metrics associated with each of user devices 110. Data management system 114 may organize, format, or otherwise process the behavioral data for presentation to application developers 104, content providers 108, or another entity using the services provided by data management system 114.

Data management system 114 may generate a segmentation interface through which a user (e.g., application developers 104, content providers 108, etc.) can identify multiple cohort groups. Advantageously, the multiple cohort groups can be identified according to non-predicated, user-specified grouping criteria. For example, a user may identify the multiple cohort groups by selecting a behavior metric or combination of behavior metrics associated with user devices 110. User devices 110 may be assigned to one or more of the multiple cohort groups based on the value of the behavior metric(s) associated with each of user devices 110. For example, if a user selects a "time of first launch" behavior metric for a particular application, user devices 110 may be assigned to cohort groups based on the time at which each of user devices 110 first launched the particular application (e.g., user devices which first launched the application on "Day 1" may be assigned to a first cohort group, user devices which first launched the application on "Day 2" may be assigned to a second cohort group, etc.).

Data management system 114 may display a graphical visualization of the multiple cohort groups via the segmentation interface. Advantageously, each of the multiple cohort groups displayed via the segmentation interface may be selectable. Data management system 114 may receive a user selection of one or more of the multiple cohort groups via the segmentation interface and define a custom segment of the behavioral data in response to the user selection. The custom segment may define a subset of user devices 110 associated with the selected cohort groups. Data management system 114 may store the custom segment (e.g., the behavioral data associated with each of the selected user devices, an indication of the user devices in the selected cohort groups, etc.) or an indication of the custom segment (e.g., an index, a data range, or other definition of the custom segment) in a data storage device.

Data management system 114 may generate a reporting interface through which a user may analyze a second set of data. The second dataset analyzed via the reporting interface may be the same or different than the behavioral data used to identify the multiple cohort groups and define the custom segment. Advantageously, the stored custom segment may be applied as a data filter in generating an analytical report. For example, a user may retrieve the custom segment (or indication thereof) from the data storage device via the reporting interface. The user may apply the custom segment to the second dataset, thereby filtering the second dataset to include or exclude data associated with the user devices identified by the custom segment. The reporting interface may be used to generate an analytical report based on the filtered second dataset. Advantageously, the analytical report may analyze a behavior metric other than the behavior metric used to define the multiple cohort groups.

Figure 2:
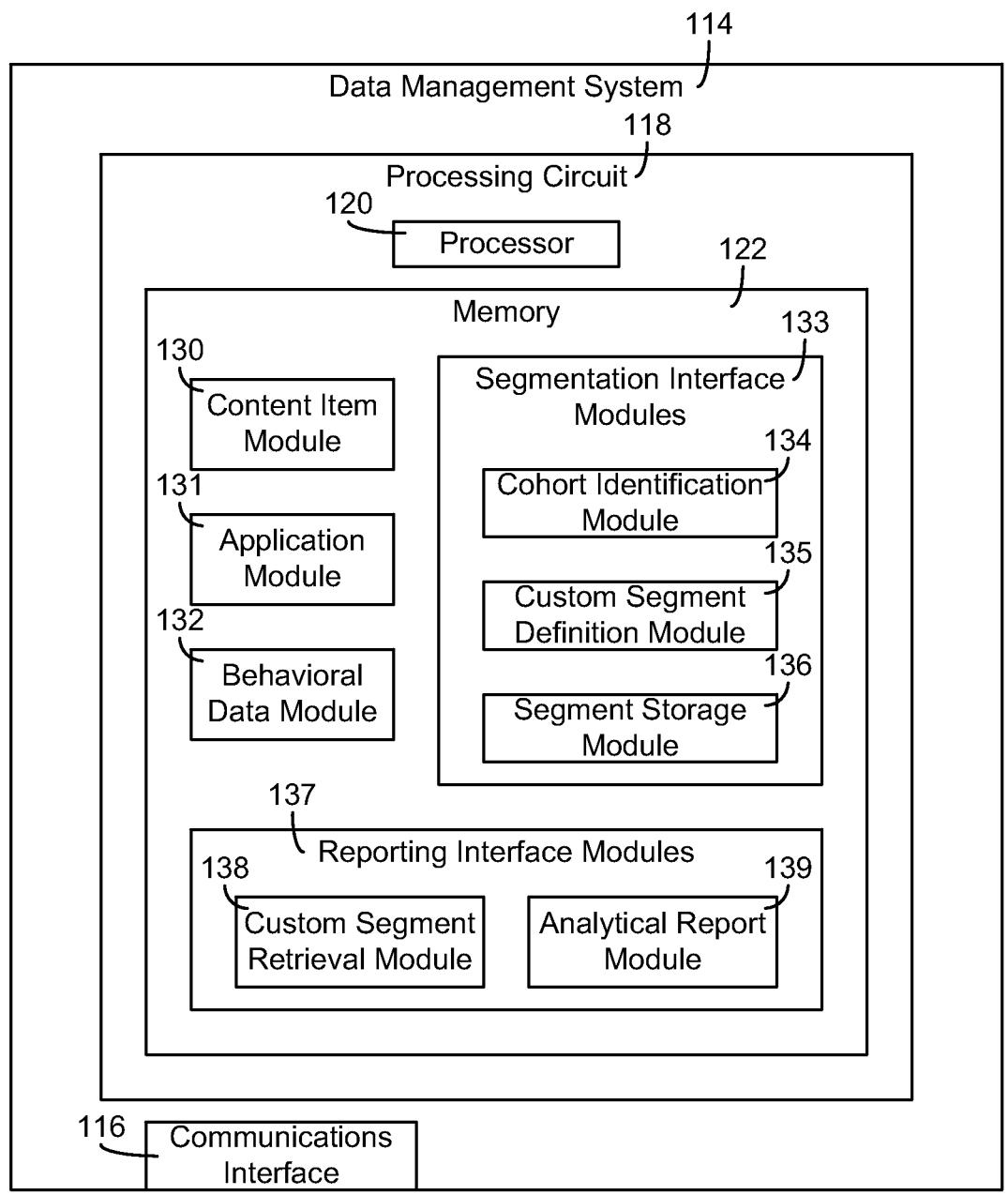
FIG. 2 is a block diagram illustrating, in greater detail, the data management system of FIG. 1, according to a described implementation.

Referring now to FIG. 2, a detailed block diagram of data management system 114 is shown, according to a described implementation. Data management system 114 is shown to include a communications interface 116 and a processing circuit 118. Communications interface 116 may include wired or wireless interfaces (e.g., jacks, antennas, transmitters, receivers, transceivers, wire terminals, Ethernet ports, WiFi transceivers, etc.) for conducting data communications with local or remote devices or systems. For example, communications interface 116 may allow data management system 114 to communicate with network 102, application developers 104, resources 106, content providers 108, user devices 110, and or data storage devices 112.

Still referring to FIG. 2, processing circuit 118 is shown to include a processor 120 and memory 122. Processor 120 may be implemented as a general purpose processor, an application specific integrated circuit (ASIC), one or more field programmable gate arrays (FPGAs), a CPU, a GPU, a group of processing components, or other suitable electronic processing components.

Memory 122 may include one or more devices (e.g., RAM, ROM, Flash® memory, hard disk storage, etc.) for storing data and/or computer code for completing and/or facilitating the various processes, layers, and modules described in the present disclosure. Memory 122 may comprise volatile memory or non-volatile memory. Memory 122 may include database components, object code components, script components, or any other type of information structure for supporting the various activities and information structures described in the present disclosure. In some implementations, memory 122 is communicably connected to processor 120 via processing circuit 118 and includes computer code (e.g., data modules stored in memory 122) for executing one or more processes described herein. In brief overview, memory 122 is shown to include a content item module 130, an application module 131, a behavioral data module 132, segmentation interface modules 133, and reporting interface modules 137.

Still referring to FIG. 2, and in greater detail, memory 122 is shown to include a content item module 130. Content item module 130 may receive a request for a content item (e.g., via communications interface 116) from resources 106 and/or user devices 110. In some implementations, the request for content items may include characteristics of one or more content slots in which the content items will be displayed. For example, such characteristics may include the URL of the resource 106 in which the content slot is located, a display size of the content slot, a position of the content slot, and/or media types that are available for presentation in the content slot. If the content slot is located on a search results page, keywords associated with the search query may also be provided to content item module 130. The characteristics of the content slot and/or keywords associated with the content request may facilitate identification of content items that are relevant to resources 106 or to the search query.

Content item module 130 may select an eligible content item in response to the request received from resources 106 or user devices 110. In some implementations, eligible content items may include content items having characteristics matching the characteristics of the content slots in which the content items are to be presented. For example, content item module 130 may select a content item having a display size which fits in a destination content slot. In some implementations, content item module 130 may resize a selected content item to fit a content slot or add additional visual content to the selected content item (e.g., padding, a border, etc.) based on the display size of the content item and the display size of the content slot.

In some implementations, content item module 130 may select a content item determined to be relevant to particular resource 106, user device 110, or search query. For example, content item module 130 may select a content item by comparing the keywords associated with each content item (e.g., specified by content providers 108, additional keywords extracted from the content item, etc.) with the keywords associated with the resource 106 or user device 110 requesting the content item. A topic or type of content included in resources 106 may be used to establish keywords for resources 106.

In some implementations, content item module 130 may select a content item by comparing the keywords associated with each content item with information (e.g., profile data, user preferences, etc.) associated with a particular user device 110 requesting the content item. In some implementations, content item module 130 may select a content item that does not match established user preferences if an insufficient number of preferred content items are available. In some implementations, content item module 130 may select a content item based on an established click-through-rate, a predicted click-through-rate, a bid price associated with each content item, or other relevant selection criteria.

In some implementations, the selected content item is transmitted to resources 106 for presentation to user devices 110 along with any requested resource content from resources 106. In other implementations, the selected content item is delivered to the user devices 110 directly (e.g., without first transmitting the content item to resources 106) from data management system 114 or from data storage devices 112. Content item module 130 may assign each content item delivered to user devices 110 (e.g., directly or indirectly) a unique identifier such that behavioral data received from user devices 110 can be associated with a particular content item.

Still referring to FIG. 2, memory 122 is shown to include an application module 131. Application module 131 may facilitate the distribution of applications from application developers 104 to user devices 110. In some implementations, application developers 104 may upload their applications to data management system 114, resources 106, or data storage devices 112. Application module 131 may store application data (e.g., compiled or non-compiled program code, executable instructions, etc.) or a uniform resource identifier (URL) specifying the location of such application data (e.g., on resources 106, data storage devices 112, etc.). User devices 110 may interact with application module 131 to obtain a listing of applications available for distribution to user devices 110. For example, application module 131 may be configured to allow user devices 110 to search for particular applications and may return a listing of relevant applications in response to the search. Application module 131 may allow user devices 110 to browse available applications, download and/or purchase applications, and arrange payment for application purchases.

In some implementations, application module 131 may modify the applications created by application developers 104. Application module 131 may modify the applications to include a software object configured to request content items from content item module 130 and/or report behavioral data to behavioral data module 132. In other implementations, application module 131 may provide application developers 104 with a software development kit configured to generate the software object and application developers 104 may use the software development kit to insert the software object into their applications prior to providing the applications to application module 131. Application module 131 may assign each application a unique identifier (e.g., an application name, version number, application ID, etc.) such that the behavioral data received from user devices 110 can be associated with a particular application.

Still referring to FIG. 2, memory 122 is shown to include a behavioral data module 132. Behavioral data module 132 may include instructions for receiving (e.g., via communications interface 116) behavioral data associated with user devices 110. Behavioral data may be received from user devices 110, application developers 104, resources 106, content providers 108, or any combination thereof. For example, behavioral data module 132 may receive application transaction information from application developers 104. The application transaction information may describe application purchases (e.g., price, time, application type, application identifier, etc.), exchanges, downloads, or other information associated with applications distributed by application developers 104.

Behavioral data module 132 may receive resource information from resources 106. Resource information may include a type or category of a particular resource (e.g., web page), resource content, a location or index of resource information (e.g., a URL), or other information associated with resources 106 (e.g., user traffic, visits by user devices 110, purchases made by user devices 110, etc.).

In some implementations, behavioral data module 132 receives behavioral data directly from user devices 110. For example, user devices 110 may report to behavioral data module 132 each time a particular application is launched by the user device. User devices 110 may report application transaction information associated with the interaction between user devices 110 and application developers 104 (e.g., application purchases, time of purchase, price, etc.). User devices 110 may report resource information associated with the interaction between user devices 110 and resources 106 (e.g., resource visits, views, online purchases, etc.). User devices 110 may report content information associated with the interaction between user devices 110 and content providers 108 (e.g., number of impressions, number of clicks, number of conversions, conversion path, conversion value, etc.).

In some implementations, behavioral data module 132 receives behavioral data from other components of data management system 114. For example, behavioral data module 132 may receive content-related information (e.g., click-through-rate, a predicted click-through-rate, a bid price associated with each content item, keyword information, etc.) from content item module 130. The content information may be combined with the data received from user devices 110 and/or content providers 108 to provide a comprehensive dataset describing the distribution and effectiveness of a particular content item. Behavioral data module 132 may receive application-related information from application module 131. The application information may be combined with data received from user devices 110 and/or application developers 104 to provide a comprehensive data set describing the distribution and use of a particular application.

Behavioral data module 132 may organize and format the behavioral data for subsequent filtering and data analysis. In some implementations, organizing and formatting the behavioral data includes associating data with a particular user device, a particular content item, and/or a particular application. Organizing the behavioral data may include arranging or combining behavioral data (e.g., into data vector, into a table entry, etc.) based on the user device with which the behavioral data is associated. In some implementations, behavioral data module 132 attaches a time stamp to each data event (e.g., application downloads, application launches, content item impressions, conversions, etc.) to organize the data events chronologically. Formatting the behavioral data may include converting disparate data values received from different entities into a unitary data format (e.g., language, structure, syntax, etc.) so that the behavioral data can be interpreted and processed in a cohesive manner.

Behavioral data module 132 may identify or calculate one or more behavior metrics in the set of behavioral data. Some behavior metrics may be pre-existing (e.g., measured, already present in the received data, non-calculated, etc.) in the set of behavioral data and may be identified be assigning a label, heading, or other indicator associating a particular data value with a behavior metric. Other behavior metrics may be calculated from measured quantities and subsequently labeled or identified. Behavioral data module 132 may associate one or more behavior metrics with a particular user device. The associated behavior metrics may be used (e.g., by segmentation interface modules 133) to identify cohort groups and/or define the custom segment.

Still referring to FIG. 2, memory 122 is shown to include segmentation interface modules 133. Segmentation interface modules 133 may generate a segmentation interface for identifying cohort groups and defining a custom segment in the set of behavioral data. The segmentation interface may include a graphical visualization of the multiple cohort groups. An illustrative graphical visualization is shown and described in greater detail with reference to FIGS. 3-6. Segmentation interface modules 133 are shown to include a cohort identification module 134, a custom segment definition module 135, and a segment storage module 136.

Cohort identification module 134 may be used to identify multiple cohort groups and assign user devices 110 to one or more of the multiple cohort groups. Advantageously, the multiple cohort groups may be identified based on user-specified, non-predicated grouping criteria. In some implementations, a user (e.g., an application developer, a content provider, a resource operator, or other entity using the analysis and reporting features of data management system 114) may specify a particular behavior metric used to identify the multiple cohort groups. A behavior metric may be specified by selecting the behavior metric from a predicated list, inputting a customized, non-predicated behavior metric, and/or specifying criteria used to define a previously non-existing behavior metric.

For example, a user may specify a "time of first launch" behavior metric for a particular application to create a plurality of "first-launch" cohort groups. Each of the first-launch cohort groups may be associated with a time period (e.g., a day, a week, a month, etc.) which has elapsed since the application was first distributed to user devices 110. A user device 110 may be assigned to a specific cohort group if the "time of first launch" behavior metric associated with the user device occurs during the time period associated with the specific cohort group (e.g., user devices 110 which first launched the application on "Day 1" may be assigned to the "Day 1" cohort group, user devices 110 which first launched the application on "Day 2" may be assigned to the "Day 2" cohort group, etc.).

In some implementations, cohort identification module 134 may use behavior metrics other than time-based groupings identify the multiple cohort groups. For example, a user may specify an "amount spent" behavior metric to create a plurality of cohort groups based on an "amount spent" behavior metric associated with user devices 110. Each of the "amount spent" cohort groups may be associated with a numerical range for an amount spent (e.g., in dollars, credits, bids, or any other currency) by user devices 110. A user device 110 may be assigned to a specific cohort group if the "amount spent" behavior metric for the user device is within the numerical range associated with the specific cohort group. Cohort identification module 134 may identify cohort groups using any type of demographic or behavioral classification.

As another example, a user may specify a "subsequent launch" behavior metric to create a plurality of "subsequent-launch" cohort groups. Each of the subsequent-launch cohort groups may be associated with a time period (e.g., a day, a week, a month, etc.) which has elapsed after the "first launch" time period. A user device 110 may be assigned to a specific cohort group if the "time of subsequent launch" behavior metric associated with the user device occurs during the time period associated with the specific cohort group. These examples are intended to be illustrative and non-limiting. In other implementations, any other type of behavior metric or combination of behavior metrics may be used to assign user devices 110 to cohort groups.

In some implementations, cohort identification module 134 uses multiple behavior metrics to identify the multiple cohort groups. Advantageously, the multiple behavior metrics "time of first launch" and "time of subsequent launch" may be used to generate a cohort-based retention report. For example, cohort identification module 134 may identify a plurality of discrete first-launch periods which have elapsed since a particular application was first distributed to user devices 110. Each of the first-launch periods may be associated with a first-launch group. Cohort identification module 134 may assign user devices 110 to a first-launch group if the time at which the user device first launched the application occurred during the first-launch period associated with the first-launch group.

Additionally, for each first-launch group, cohort identification module 134 may identify one or more discrete time periods which have elapsed since an end of the first-launch period associated with the first-launch group. Each of the discrete time periods may be associated with a cohort group. Cohort identification module 134 may assign a user device to one or more of the cohort groups if the user device subsequently launched the application during the discrete time period associated with the cohort group. In other words, all user devices 110 which first launched the application during the same first-launch period (e.g., on the same day, same week, etc.) may be assigned to one or more cohort groups based on the times at which the user device subsequently launched the same application. An application developer may view the cohort-based retention report to determine user retention rates for a particular application.

In some implementations, cohort identification module 134 may identify cohort groups for individual content items or applications rather than for user devices 110. Content items and/or applications may be assigned to cohort groups based on a behavior metric or metrics associated with the content items and/or applications. For example, content items and/or applications first distributed to user devices 110 on "Day 1" may be assigned to a "Day 1" cohort group. Cohort identification module 134 may define cohort groups based on any behavior metric or combination of behavior metrics associated with the content items or applications (e.g., time of distribution, purchase price, number of clicks, number of conversions, bid price, user devices to which the content items or applications were distributed, etc.).

Still referring to FIG. 2, segmentation interface modules 133 are shown to include a custom segment definition module 135. Custom segment definition module 135 may be used to define a custom segment of the set of behavioral data. The custom segment may be a subset of the behavioral data. The subset of the behavioral data may be associated with a subset of user devices 110, content items, and/or applications represented in the full set of behavioral data.

Custom segment definition module 135 may generate a graphical visualization of the multiple cohort groups. Each of the multiple cohort groups may be displayed in the graphical visualization with information pertaining to the cohort group. For example, custom segment definition module 135 may determine a number of user devices 110 in each cohort group or a percentage of user devices 110 in each cohort group. The percentage may be relative to the total number of user devices 110 represented in the set of behavioral data, relative to a total number of user devices having a shared behavior metric (e.g., time of first launch, etc.), or relative to any other set or subset of user devices 110 as may be specified or customized by a user. The percentage or number may be displayed as a numerical indicator (e.g., "32.01%"), a color or color shading (e.g., darker colors indicating higher numbers/percentages), or any other indicator of the number or percentage of user devices 110 in a particular cohort group.

Advantageously, custom segment definition module 135 may display each of the multiple cohort groups as a selectable icon in the graphical visualization. A user may select one or more of the multiple cohort groups through the graphical visualization (e.g., by clicking, highlighting, checking, or otherwise selecting one or more of the cohort groups) to define the custom segment. By selecting one or more of the cohort groups, a user may identify a subset of user devices 110 (e.g., the user devices included in the selected cohort groups). The custom segment may include the identified user devices 110 and/or behavioral data associated with the identified user devices.

For implementations in which the cohort groups include content items or applications rather than user devices 110, a user may identify a subset of content items or applications by selecting one or more of the cohort groups. The custom segment may include the identified content items, applications, and/or behavioral data associated with the identified content items or applications. Custom segment definition module 135 may communicate the defined custom segment to segment storage module 136.

Still referring to FIG. 2, segmentation interface modules 133 are shown to include a segment storage module 136. Segment storage module 136 may receive the custom segment or an indication of the custom segment from custom segment definition module 135. The indication of the custom segment may be an index, a range, a list of user devices 110, or any other specification of the subset of the behavioral data included in the custom segment. Segment storage module 136 may store the custom segment or an indication thereof in a data storage device. The data storage device may be local to data management system 114 (e.g., memory 122) or a remote data storage device (e.g., data storage devices 112, a data storage device local to application developers 104, etc.). Advantageously, segment storage module 136 may make the stored information accessible to reporting interface modules 137 for use in a subsequent analytical report.

Still referring to FIG. 2, memory 136 is shown to include reporting interface modules 137. Reporting interface modules 137 may generate a reporting interface through which a user (e.g., an application developer, a content provider, etc.) may generate an analytical report. Reporting interface modules 137 are shown to include a custom segment retrieval module 138 and an analytical report module 139. Custom segment retrieval module 138 may retrieve the custom segment or indication thereof from the data storage device in which it was stored by segment storage module 136. Analytical report module 139 may apply the custom segment as a data filter to a second set of data (e.g., "the second dataset") in generating an analytical report.

In some implementations, the second dataset may be the same set of behavioral data used by segmentation interface modules 133 (e.g., to identify the cohort groups and define the custom segment). In other implementations, the second dataset may include some of the same behavioral data used by segmentation interface modules 133 and some additional data. The additional data may be additional behavioral data received from user devices 110 after the custom segment was defined or other data received from other sources. The additional data may be associated with some of the same user devices 110 included in the identified cohort groups and/or additional user devices not included in the identified cohort groups. In further implementations, the second dataset may be a set of third-party data including none of the behavioral data used by segmentation interface modules 133. The third-party data may pertain to some or all of the same user devices 110 included in the identified cohort groups or to different user devices. The second dataset may include behavioral data, non-behavioral data, or a combination of behavioral and non-behavioral data.

In some implementations, applying the custom segment to the second dataset includes selecting a portion of the second dataset for inclusion in the analytical report. Analytical report module 139 may use the custom segment (or indication thereof) to filter data from the second dataset prior to generating an analytical report based on the second dataset. For example, the custom segment may identify a plurality of user devices 110. In some implementations, applying the custom segment to the second dataset may involve selecting only the data associated with the user devices 110 identified by the custom segment. In other implementations, applying the custom segment to the second dataset involves removing data associated with the identified user devices 110 from the second dataset. As another example, the custom segment may identify a plurality of content items or applications. Applying the custom segment to the second dataset may involve selecting or removing data associated with the identified content items and/or applications.

Analytical report module 139 may generate an analytical report based on the filtered data in the second dataset (e.g., after applying the custom segment). The analytical report may analyze any metric included in the second dataset. Advantageously, the analytical report may analyze a metric other than the behavior metric used by segmentation interface modules 133 to identify the multiple cohort groups and define the custom segment. This functionality allows analytical report module 139 to produce reports analyzing a second behavior metric for only user devices 110 having a first behavior metric within a specified range. In other words, analytical report module 139 can answer the question "for all user devices having a first behavior metric within a specified range, what percentage/number/ratio of them have a second behavior metric within a second specified range?"

In some implementations, the described systems may be used to generate cohort-based user retention reports. For example, multiple cohort groups can be identified based on a "first launch" behavior metric describing a time at which a user device first launched an application and a "subsequent launch" behavior metric describing a time or times at which the same user device subsequently launched the application. Analytical report module 139 can generate cohort-based user retention reports which answer the question "for all user devices which first launched an application within time period X, how many of them (e.g., number, percentage, etc.) subsequently launched the application Y days/weeks later?"

Referring now to FIGS. 3-6, several drawings of a segmentation interface 200 are shown, according to a described implementation. Segmentation interface 200 may be generated by segmentation interface modules 133 to identify multiple cohort groups and define a custom segment based on the identified cohort groups. Advantageously, segmentation interface 200 may provide a graphical visualization of the multiple cohort groups through which a user (e.g., an application developer, a content provider, etc.) can contextually examine the identified cohort groups. Furthermore, the user can define the custom segment via segmentation interface 200 by selecting (e.g., in a non-predicated, user-defined manner) one or more of the multiple cohort groups.

Figure 3:
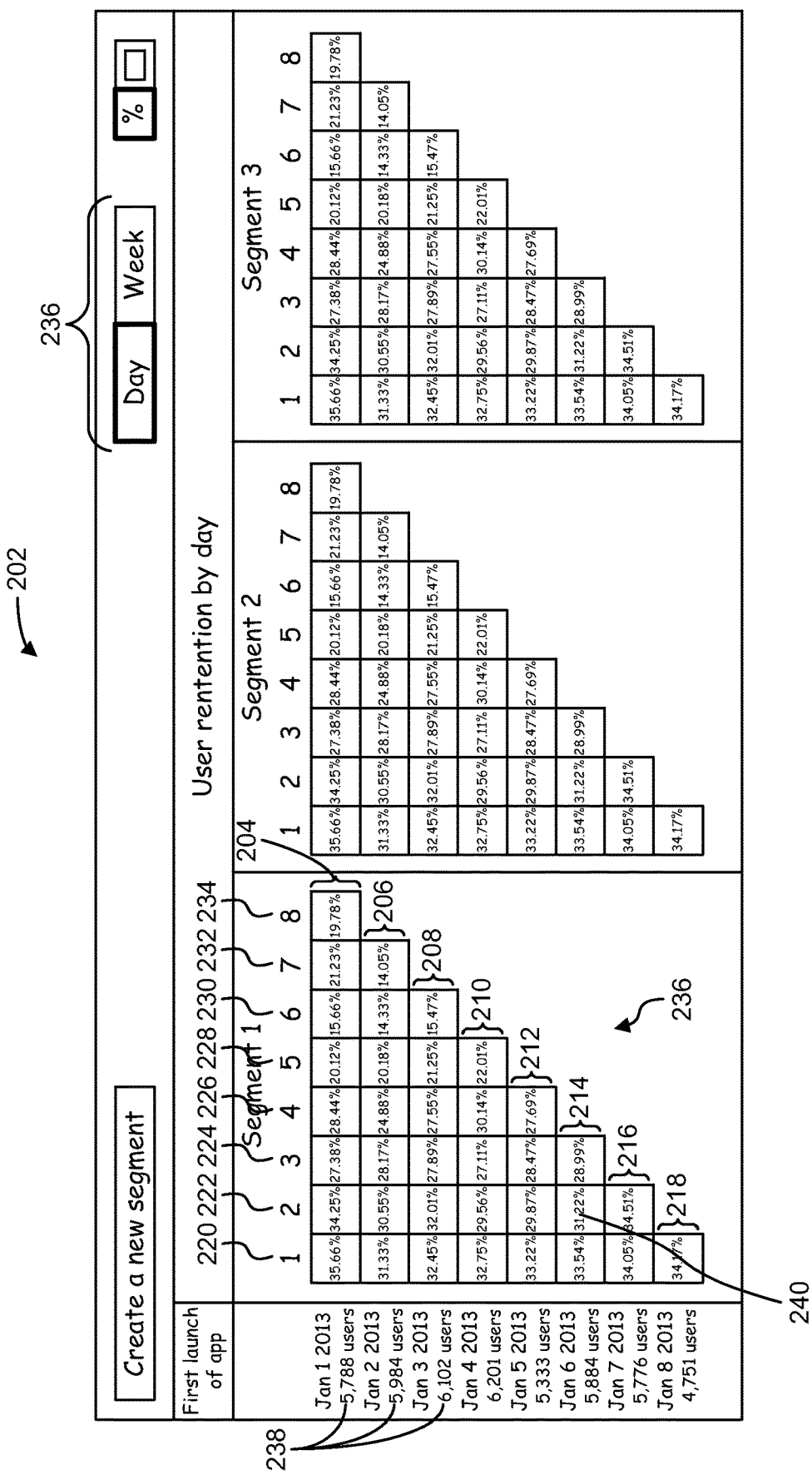
FIGS. 3-4 are drawings of a segmentation interface generated by the data management system of FIG. 2, the segmentation interface including a graphical visualization for identifying multiple cohort groups and presenting the multiple cohort groups as selectable icons, according to a described implementation.

Referring specifically to FIG. 3, segmentation interface 200 is shown displaying a cohort table 202. Cohort table 202 may display a plurality of cohort groups according to any type of demographic or behavioral classification (e.g., amount spent, geographic region, type of user device, user interest data, user profile information, etc.). In some implementations cohort table 202 is a cohort retention table. Cohort table 202 may be displayed in response to a user-specification (e.g., selection, indication, customization, etc.) of multiple behavior metrics to identify the cohort groups.

For example, cohort table 202 is shown to include three data segments (e.g., segment 1, segment 2, and segment 3). Segments 1-3 may be defined by a user specification of a first metric. In some implementations, the first metric may be an "application identity" metric, thereby segregating the behavioral data based on the identity of the application with which the data is associated. In other words, segment 1 may include behavioral data associated with a first application, segment 2 may include behavioral data associated with a second application, and segment 3 may include behavioral data associated with a third application. In other implementations, segments 1-3 may segregate the behavioral data based on any other metric or attribute (e.g., associated content item, language of the associated application/content item, region of distribution, content provider ID, application developer ID, etc.).

Still referring to FIG. 3, cohort table 202 is shown to include multiple rows 204-218. Rows 204-218 may be defined according to a second behavior metric. In some implementations, the second behavior metric may be a "first-launch" behavior metric (e.g., describing a time at which a user device first launched the associated application). Each of rows 204-218 may correspond to a different first-launch period. For example, row 204 is shown with the "January 1, 2013" label, indicating that row 204 includes user devices which first launched the application on Jan. 1, 2013. The remaining rows 206-218 may correspond to other first-launch periods. For example, row 204 may be associated with a "January 2, 2013" first-launch period, row 206 may be associated with a "January 3, 2013" first-launch period, etc.

Segmentation interface 200 is shown to include a range selector 236. In some implementations, range selector 236 is a time period selector (e.g., for implementations in which cohort groups are time-based). Range selector 236 may be used to change the duration of the time periods associated with rows 204-218. For example, range selector 236 may be used to change from time periods having a one day duration to time periods having a one hour, one week, two week, one month, one year, or any other duration. Range selector 236 may be a toggle switch, a drop-down menu, a radio button, a check box, or any other user interface option for switching between multiple time period durations. In some implementations, range selector 236 may allow a user to specify any time range (e.g., an arbitrary time range such as three months fourteen days and sixteen hours).

In some implementations, range selector 236 is used to define a range for cohort groups defined by non-time-based behavior metrics. For example, range selector 236 may be used to define monetary ranges (e.g., for an "amount spent" or "conversion value" behavior metric), geographic ranges (e.g., for location-based behavior metrics), or any other type of numerical or non-numerical range to further define granularity of the cohort groups.

Still referring to FIG. 3, cohort table 202 is shown to include multiple columns 220-234. Columns 220-234 may be defined according to a third behavior metric. In some implementations, the third behavior metric is a "subsequent-launch" behavior metric (e.g., describing a time at which a user device subsequently launched the associated application after the initial "first launch"). If a user device launched the application more than twice (i.e., more than one "subsequent launches"), the user device may have multiple "subsequent-launch" behavior metrics associated with a single application or the subsequent-launch behavior metric for a user device may have multiple values. Each of the subsequent-launch behavior metrics or multiple values may indicate a different time at which the user device launched the application after the initial first-launch. Each of columns 220-234 may correspond to a different subsequent-launch period (e.g., relative to the same first-launch period).

In some implementations, the durations of the subsequent-launch periods may be the same or similar to the durations of the first-launch periods. For example, if the first-launch periods have a duration of one day, the subsequent-launch periods may also have a duration of one day. Time period selector 236 may be used to change the duration of the time periods associated with columns 220-234. In some implementations, the durations of the first-launch time periods and subsequent-launch time periods may be changed independently. In some implementations, segmentation interface 200 may include an option to increase or decrease the number of rows or columns displayed.

In some implementations, the subsequent-launch periods associated with columns 220-234 may begin immediately after each of the first-launch periods. For each first-launch period (e.g., for each of rows 204-218), the following subsequent-launch periods in the same row may be discrete (e.g., non-overlapping) and consecutive. For example, for the "January 1, 2013" first launch period (e.g., row 204), column 220 may represent a "January 2, 2013" subsequent-launch period because the "January 2, 2013" period begins immediately after the "January 1, 2013" first-launch period. However, for the "January 2, 2013" first-launch period (e.g., row 206), column 220 may represent a "January 3, 2013" subsequent-launch period because the "January 3, 2013" period begins immediately after the end of the "January 2, 2013" first-launch period.

Still referring to FIG. 3, cohort table 202 is shown to include multiple cells 236. Each of cells 236 may be defined by the intersection of one of rows 204-218 and one of columns 220-234. Each of cells 236 may represent a separate cohort group. Cells 236 may include user devices having a first behavior metric value corresponding to the row 204-218 in which the cell is located and a second behavior metric value corresponding to the column 220-234 in which the cell is located. For example, the top-left cell is a member of both row 204 and column 220. Therefore, the top-left cell may include user devices which first launched the application during the first-launch period associated with row 204 (e.g., January 1, 2013) and which subsequently launched the application during the subsequent launch period associated with column 220 (e.g., January 2, 2013). In other words, a user device may be assigned to a cohort group (e.g., represented as a cell in cohort table 202) if the user device first-launched an application during a first-launch period associated with the cohort group and subsequently-launched the application during a subsequent-launch period associated with the cohort group.

Still referring to FIG. 3, segmentation interface 200 may include numerical information pertaining to the quantity of user devices in rows 204-218, columns 220-234, or cells 236. For example, segmentation interface 200 is shown to include quantifiers 238 indicating a total number of user devices in each of rows 204-218. Quantifiers 238 may describe the number of user devices which first launched an application during each of the first-launch period associated with rows 204-218. For example, the quantifier 238 associated with row 204 is shown displaying the information "5,788 users." This information may indicate that 5,788 user devices first launched the application during the first-launch period associated with row 204 (e.g., Jan. 1, 2013).

In some implementations, segmentation interface 200 may include percentages 240. Percentages 240 may associated with and displayed for each of cells 236. A percentage for a particular cell may indicate a percentage of user devices in the cohort group associated with the particular cell. A percentage for a particular cell may be relative to the total number of user devices in the row in which the cell is located, as specified by quantifiers 238. For example, the percentage "35.66%" in the top-left cell may indicate that the top-left cell includes 35.66% of the user devices in row 204 (e.g., 35.66% of 5,788). In other implementations, percentages 240 may be replaced with numbers of user devices. For example, instead of displaying "35.66%" the top-left cell may display "2064 users" (e.g., 0.3566*5,788 users=2064 users).

Figure 4:
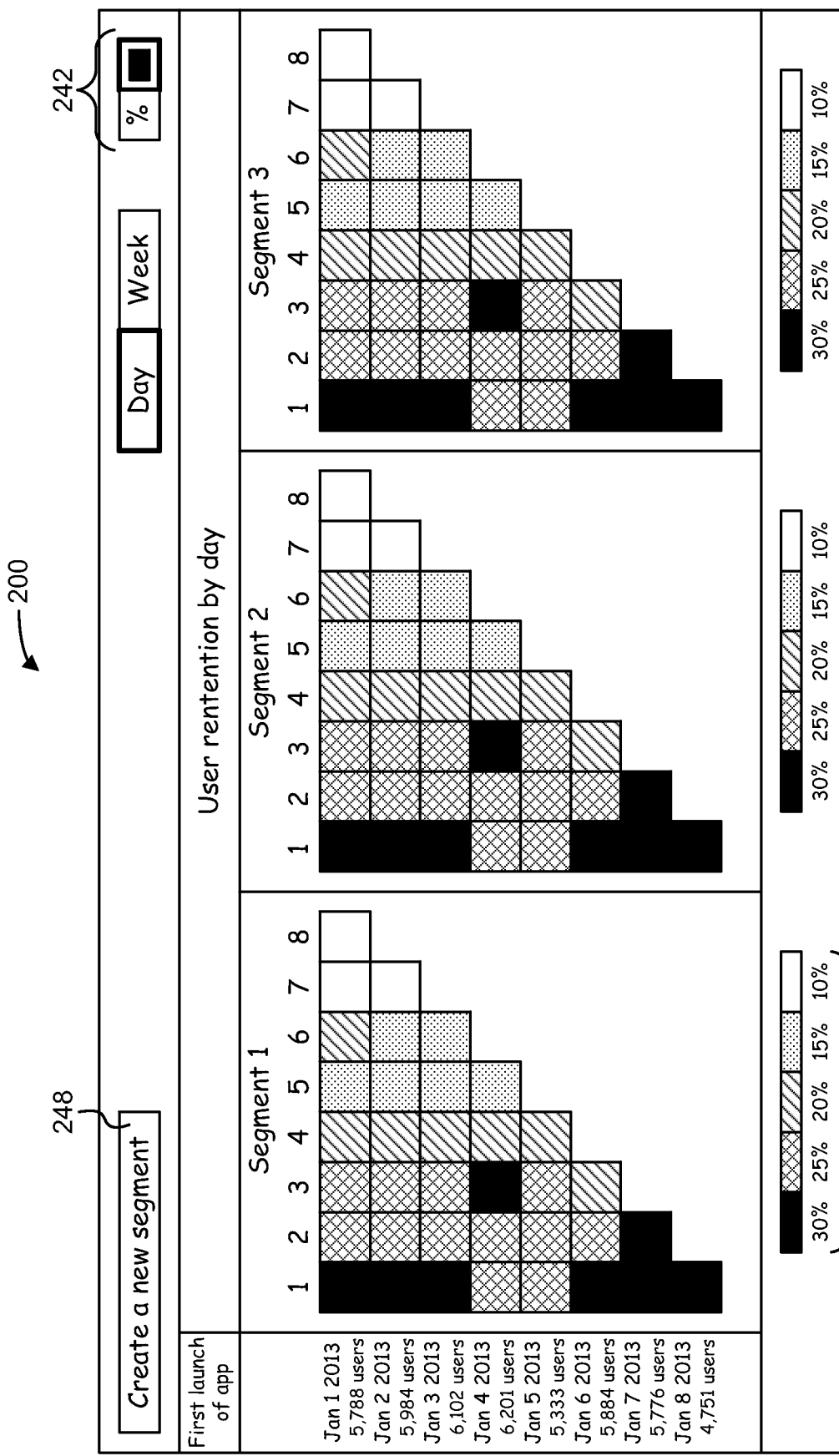

Referring now to FIG. 4, in some implementations, segmentation interface 200 may include a text display selector 242. Text display selector 242 may cause segmentation interface 200 to display or not display percentages 240 for each of cells 236. Text display selector 242 may be a toggle switch, a radio button, a drop-down list, or any other user interface element for enabling or disabling percentages 240. Text display selector 242 may allow a user to switch between percentages 240 and a gradation key 246 for indicating the relative number of user devices in each of cells 236.

When percentages 240 are hidden, each of cells 236 may be shaded (e.g., colored, darkened, intensified, saturated, etc.) to indicate the relative number of user devices in each of cells 236. For example, a darker shading for a particular cell may indicate that the cell includes more user devices than a neighboring cell with a relatively lighter shading. Gradation key 246 may provide an indication of the percentages 240 associated with each gradation. In some implementations, gradation key 246 may be adjustable (e.g., by a user, via a slider, etc.) to alter the shading associated with percentages 240. Advantageously, altering the shading may be useful to distinguish between a plurality of cells having relatively similar shading gradations. Although the shadings are shown as black-and-white, any color may be used.

In some implementations, each of segments 1-3 may be represented with a different base color. For example, the cells 236 in segment 1 may be represented with various shades of blue (or any other color). Cells shaded dark blue may indicate a relatively higher number or percentage of user devices than cells shaded lighter blue. Segment 2 may be represented with various shades of green. Cells shaded dark green may indicate a relatively higher number or percentage of user devices than cells shaded lighter green. In other implementations, a full spectrum of colors may be used to represent a single segment. Gradation key 236 may provide the mapping between a specific color and the numerical value which the color represents.

Still referring to FIG. 4, segmentation interface 200 is shown to include a "create new segment" button 248. Button 248 may be selected by a user (e.g., clicked, activated, etc.) to cause segmentation interface 200 to display a custom segment selection interface 250.

Figure 6:
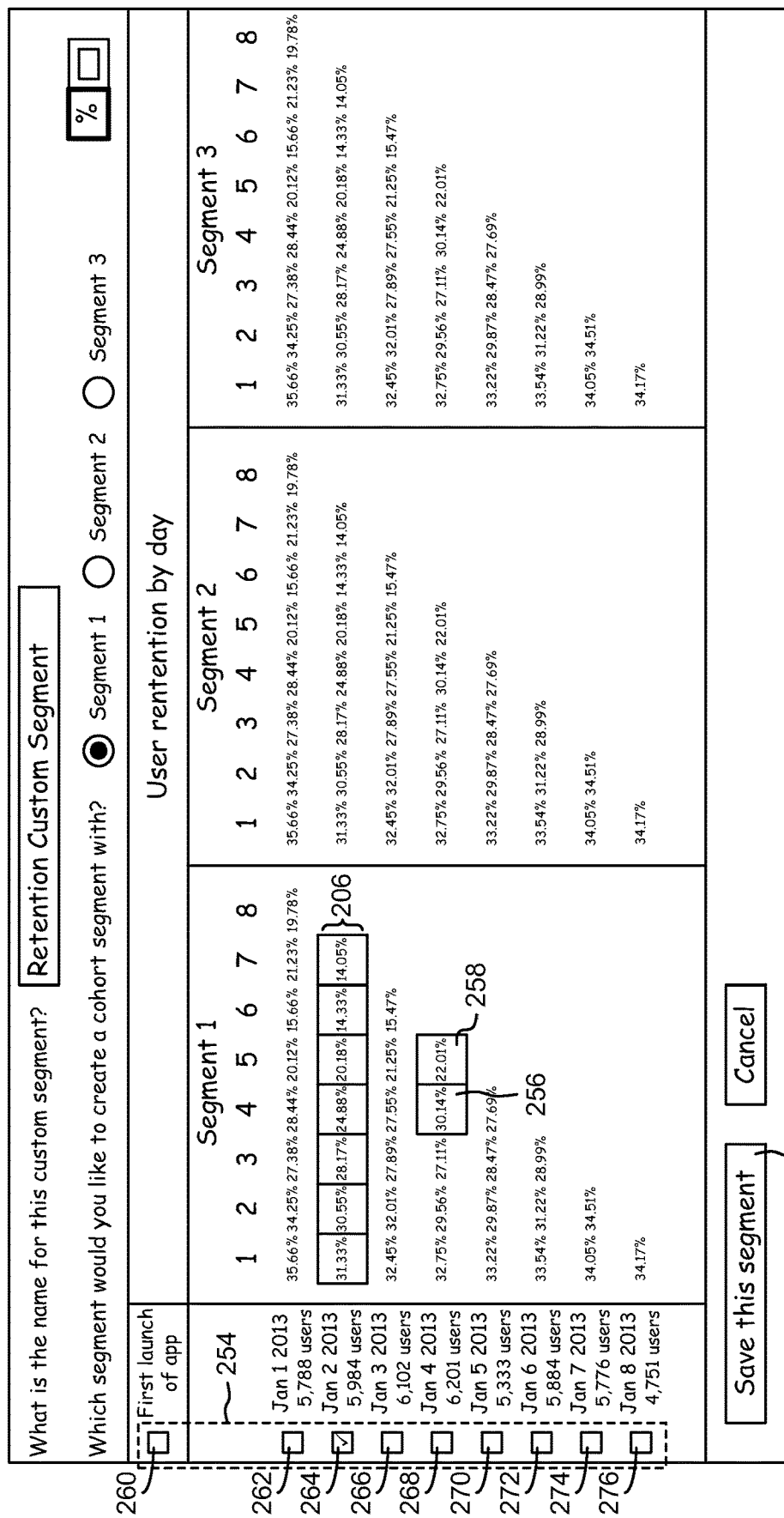

Referring now to FIGS. 5 and 6, custom segment selection interface 250 is shown, according to a described implementation. Custom segment selection interface 250 may be used to define a custom segment by facilitating the selection of one or more cohort groups. In some implementations, custom segment selection interface 250 may be a component of segmentation interface 200.

Custom segment selection interface 250 is shown to include a dialog box 278 and a segment selector 280. Dialog box 278 may be used to input (e.g., via a user input device) a name for the custom segment defined via interface 250. For example, a user may type a segment name (e.g., "Retention Custom Segment") into dialog box 278 to identify the custom segment for future retrieval. Segment selector 280 may be used to select one of segment 1, segment 2, and segment 3 to use for defining the custom segment. Making a selection via segment selector 280 may cause the selected segment (e.g., segment 1) to be highlighted (e.g., colored, darkened, emphasized, saturated, etc.) relative to the non-selected segments (e.g., segments 2-3).

Custom segment selection interface 250 is shown to include multiple cells 236. Each of cells 236 may represent a separate cohort group as described with reference to FIGS. 3-4. Advantageously, in custom segment selection interface 250, each of cells 236 may be selectable. In some implementations, a user may select a cell by clicking on the cell. Referring specifically to FIG. 5, cell 252 is shown in a selected state. Selecting a cell may highlight, emphasize, outline, darken, intensify, or otherwise mark the cell as having been selected. For example, cell 252 is shown with percentages 240 darkened and/or bolded relative to the remaining unselected cells.

Referring specifically to FIG. 6, in some implementations, custom segment selection interface 250 may include a mechanism 254 for selecting multiple cells simultaneously. For example, mechanism 254 is shown as a series of checkboxes 260-276. Each of checkboxes 262-276 may be used to select or deselect an entire row 204-218 of cells. For example, checkbox 262 may be used to select/deselect all of the cells in row 204, checkbox 264 may be used to select/deselect all of the cells in row 206, etc. As shown in FIG. 6, checkbox 264 is checked, thereby selecting all of the cells in row 206. Checkbox 260 may be used to select or deselect all of cells 236 in each of rows 204-218. Individual cells (e.g., cells 256, 258, etc.) may be selected or deselected by clicking on the cell desired to be selected.

By selecting one or more cells, a user can define a custom segment. The custom segment may include a subset of user devices (e.g., the user devices represented in the selected cells) and/or a subset of the behavioral data associated with the subset of user devices.

Still referring to FIG. 6, custom segment selection interface is shown to include a "save this segment" button 282.

Button 282 may be used (e.g., clicked, selected, activated, etc.) to save the custom segment (or an indication thereof) in a data storage device. The indication of the custom segment may be an index, a range, a list of user devices, or any other specification of the subset of the behavioral data included in the custom segment. Advantageously, the custom segment may be stored such that it may be retrieved for subsequent use in generating an analytical report.

Figure 7:
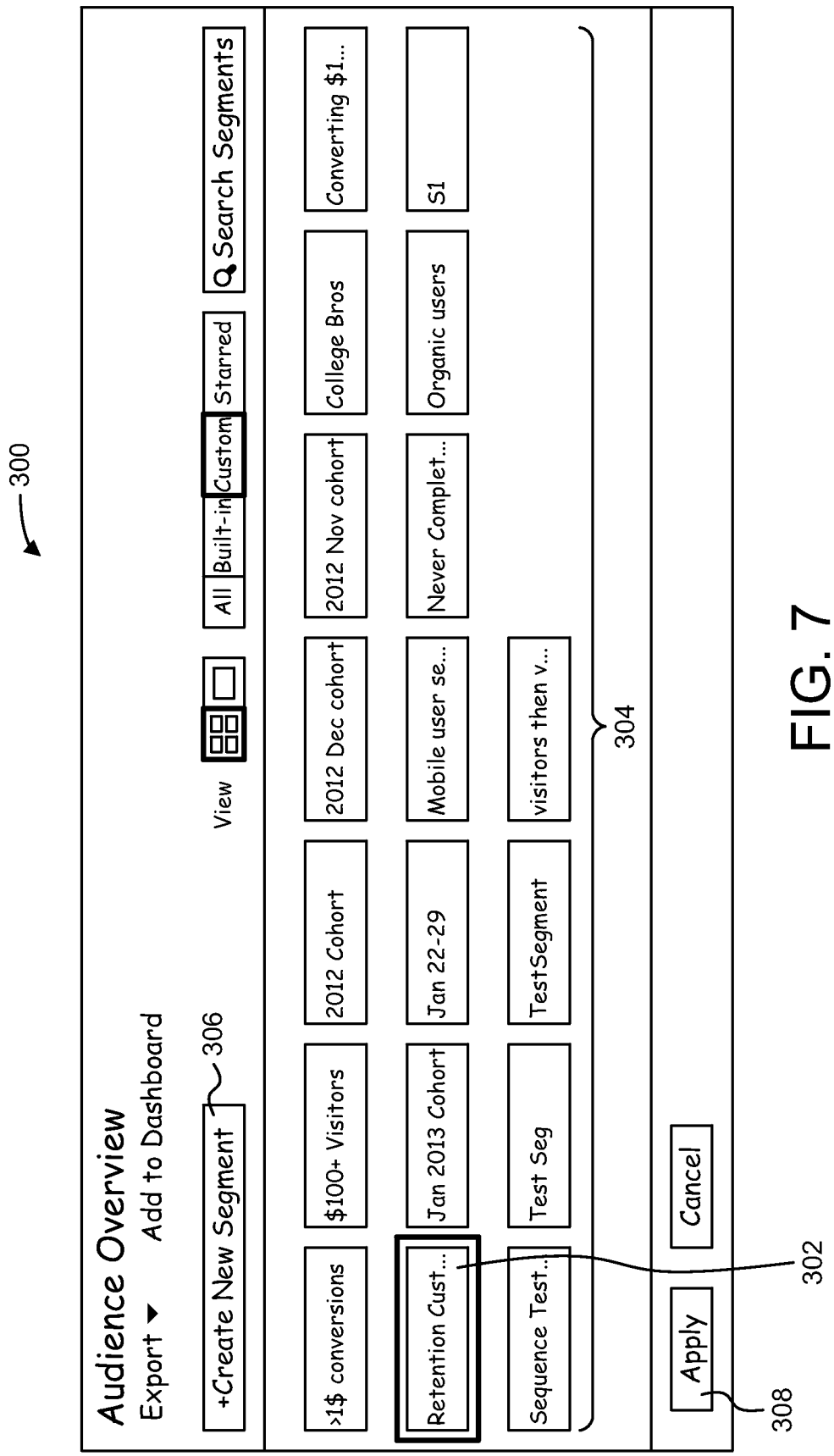
FIG. 7 is a drawing of a reporting interface for retrieving the custom segment from the data storage device and applying the custom segment as a data filter in generating an analytical report, according to a described implementation.

Referring now to FIG. 7, a drawing of a reporting interface 300 is shown, according to a described implementation. Reporting interface 300 may be generated by reporting interface modules 137. Reporting interface 300 may be used to retrieve a custom segment (e.g., previously defined via segmentation interface 200) and apply the custom segment as a data filter to a second set of data in generating an analytical report.

Reporting interface 300 is shown to include a listing of custom segments 304. Custom segments 304 may have been previously defined using segmentation interface 200 or otherwise created using any other segmentation interface or process. Custom segments 304 may be imported or retrieved from a data storage device in which segmentation interface 200 stores newly-defined custom segments. For example, custom segments 304 are shown to include "Retention Custom Segment" 302. Retention Custom Segment 302 may have been previously defined and stored as described with reference to FIGS. 3-6. Segment 302 may be retrieved from a data storage device in which segmentation interface 200 stores custom segments and presented as a selectable option via reporting interface 300.

Reporting interface 300 is shown to include a "create new segment" button 306 and an "apply" button 308. Button 306 may be selected (e.g. clicked, activated, etc.) by a user to define a new custom segment. In some implementations, selecting button 306 may cause segmentation interface 200 to be presented. Button 208 may be selected to apply a custom segment (e.g., Retention Custom Segment 302) to a second set of data (e.g., "the second dataset").

In some implementations, the second dataset may be the same set of behavioral data used by segmentation interface 200 to identify the cohort groups and define the custom segment. In other implementations, the second dataset may include some of the same behavioral data used by segmentation interface 200 and some additional data. The additional data may be additional behavioral data received from user devices 110 after the custom segment was defined or other data received from other sources. The additional data may be associated with some of the same user devices 110 included in the identified cohort groups and/or additional user devices not included in the identified cohort groups. In further implementations, the second dataset may be a set of third-party data including none of the behavioral data used by segmentation interface 200. The third-party data may pertain to some or all of the same user devices 110 included in the identified cohort groups or to different user devices. The second dataset may include behavioral data, non-behavioral data, or a combination of behavioral and non-behavioral data.

In some implementations, applying the custom segment to the second dataset includes selecting a portion of the second dataset for inclusion in the analytical report. The custom segment (or indication thereof) may be used to filter data from the second dataset prior to generating the analytical report. For example, the custom segment may identify a plurality of user devices 110. In some implementations, applying the custom segment to the second dataset may involve selecting only the data in the second dataset associated with the user devices 110 identified by the custom segment. In other implementations, applying the custom segment to the second dataset involves removing data associated with the identified user devices 110 from the second dataset. As another example, the custom segment may identify a plurality of content items or applications. Applying the custom segment to the second dataset may involve selecting or removing the data in the second data set associated with the identified content items and/or applications.

In some implementations, applying the custom segment to the second dataset includes selecting the entirety of the second dataset. In other words, the selected portion of the second dataset may include all the data in the second dataset. The entirety of the second dataset may be selected when the custom segment is applicable to the whole set of data available.

Still referring to FIG. 7, reporting interface 300 may be used generate an analytical report based on the filtered data in the second dataset (e.g., after applying the custom segment). The analytical report may analyze any metric included in the second dataset. Advantageously, the analytical report may analyze a metric other than the behavior metric used by segmentation interface 200 to identify the multiple cohort groups and define the custom segment.

Figure 8:
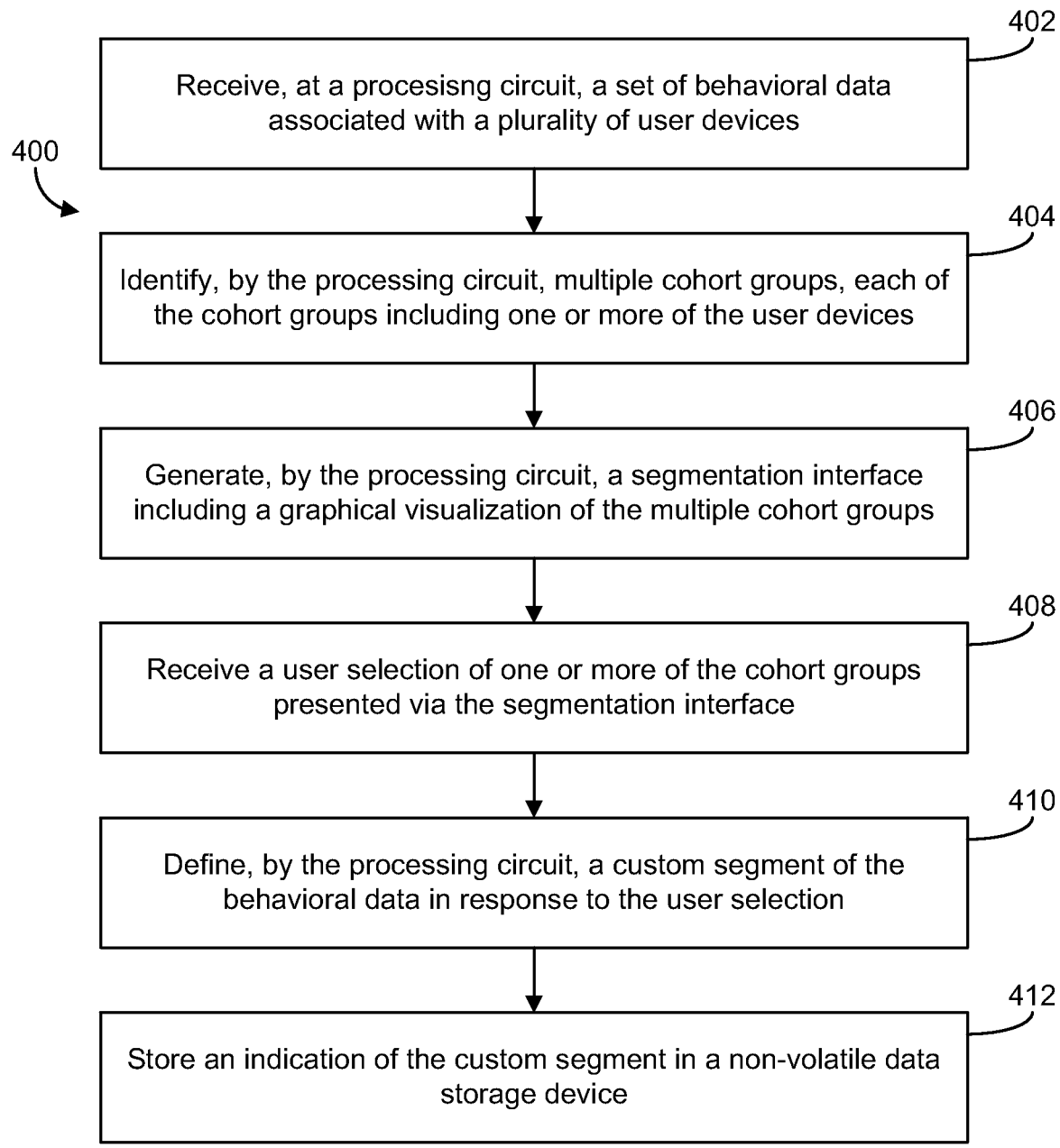
FIG. 8 is a flowchart of a process for defining a custom segment in a set of behavioral data, according to a described implementation.

Referring now to FIG. 8, a flowchart of a process 400 for defining a custom segment in a set of behavioral data is shown, according to a described implementation. Process 400 may be performed by data management system 114 using processing circuit 118. Process 400 is shown to include receiving, at a processing circuit, a set of behavioral data associated with a plurality of user devices (step 402). Behavioral data may include any data relating to an action, a response, an interaction, a communication, a reaction, or any other behavior of a user device (e.g., user devices 110). Behavioral data may also include any data associated with a user device represented in the set of behavioral data. In some implementations, the behavioral data may include a behavior metric for each of the user devices represented in the set of behavioral data.

Behavioral data may be received from user devices, application developers (e.g., application developers 104), resources (e.g., resources 106), content providers (e.g., content providers 108), or any combination thereof. For example, behavioral data may include application transaction information received from application developers. The application transaction information may describe application purchases (e.g., price, time, application type, application identifier, etc.), exchanges, downloads, or other information associated with applications distributed by the application developers to one or more user devices. As another example, behavioral data may include resource information. Resource information may include a type or category of a particular resource (e.g., web page), resource content, a location or index of resource information (e.g., a URL), or other information associated with user devices (e.g., user traffic, visits by user devices, purchases made by user devices, etc.).

In some implementations, behavioral data may be received directly from user devices. For example, user devices may report each time a particular application is launched by the user device. User devices may report application transaction information associated with the interaction between user devices and application developers (e.g., application purchases, time of purchase, price, etc.). User devices may report resource information associated with the interaction between user devices and resources (e.g., resource visits, views, online purchases, etc.). User devices may report content information associated with the interaction between user devices and content providers (e.g., number of impressions, number of clicks, number of conversions, conversion path, conversion value, etc.).

In some implementations, behavioral data may be received from other sources. For example, behavioral data may include content-related information (e.g., click-through-rate, a predicted click-through-rate, a bid price associated with each content item, keyword information, etc.) received from a content distribution module (e.g., content module 130). The content information may be combined with the data received from user devices and/or content providers to provide a comprehensive data set describing the distribution and effectiveness of a particular content item. Behavioral data may include application-related information from an application module (e.g., application module 131). The application information may be combined with data received from user devices and/or application developers to provide a comprehensive data set describing the distribution and use of a particular application.

In some implementations, step 402 includes actively retrieving the behavioral data from a local or remote data structure (e.g., a data structure stored in a local or remote memory device). For example, behavioral data module 132 may access the behavioral data from a data structure stored in a local memory of data management system 114 (e.g., memory 122), a remote data storage device (e.g., data storage devices 112), or a data storage device local to application developers 104, resources 106, content providers 108, or user devices 110.

Still referring to FIG. 8, process 400 is shown to include identifying, by the processing circuit, multiple cohort groups, each of the cohort groups including one or more of the user devices (step 404). The cohort groups may be identified based on the behavior metric for each of the user devices. Advantageously, the multiple cohort groups may be identified based on user-specified, non-predicated grouping criteria. In some implementations, a user (e.g., an application developer, a content provider, a resource operator, or other entity using the analysis and reporting features of data management system 114) may specify a particular behavior metric used to identify the multiple cohort groups. A behavior metric may be specified by selecting the behavior metric from a predicated list, inputting a custom non-predicated behavior metric, and/or specifying criteria used to define a previously non-existing behavior metric.

For example, a user may specify a "time of first launch" behavior metric for a particular application to create a plurality of "first-launch" cohort groups. Each of the first-launch cohort groups may be associated with a time period (e.g., a day, a week, a month, etc.) which has elapsed since the application was first distributed to a group of users or user devices. A user device may be assigned to a specific cohort group if the "time of first launch" behavior metric associated with the user device occurs during the time period associated with the specific cohort group (e.g., user devices which first launched the application on "Day 1" may be assigned to the "Day 1" cohort group, user devices which first launched the application on "Day 2" may be assigned to the "Day 2" cohort group, etc.).

In other implementations, various other behavior metrics may be used to identify the multiple cohort groups. For example, a user may specify an "amount spent" behavior metric to create a plurality of "amount spent" cohort groups. Each of the "amount spent" cohort groups may be associated with a numerical range for an amount spent (e.g., in dollars, credits, bids, or any other currency) by the user devices. A user device may be assigned to an "amount spent" cohort group if the "amount spent" behavior metric for the user device is within the numerical range associated with the "amount spent" cohort group.

In some implementations, multiple behavior metrics may be used to define the cohort groups. For example, the cohort groups may be defined according to a first behavior metric (e.g., indicating a time at which a user device first launched an application, the time of first launch occurring within a first time period) and a second behavior metric (e.g., indicating whether the user device launched the application during one or more time periods subsequent to the first time period). In some implementations, step 404 may involve identifying cohort groups for individual content items or applications rather than for user devices. Content items and/or application may be assigned to cohort groups based on a behavior metric or metrics associated with the content items and/or applications.

In some implementations, step 404 involves actively reorganizing data structures within a memory device. For example, cohort identification module 134 may access the behavioral data from a data structure (e.g., local or remote) in which the behavioral data is stored. Cohort identification module 134 may arrange the data structures according to the user-specified behavior metric and store the rearranged data structures in the same or different memory device.

Still referring to FIG. 8, process 400 is shown to include generating, by the processing circuit, a segmentation interface including a graphical visualization of the multiple cohort groups (step 406). Custom segment definition module may map (e.g., copy, translate, etc.) the rearranged data structures representing the multiple cohort groups from a memory device in which they are stored to a graphical processing unit. The graphical processing unit may display the data structures visually as cohort groups. The cohort groups may be presented as part a visual user interface (i.e., the "segmentation interface"), presented to a user via a user interface device (e.g., an electronic display, a printer generating a printout of the user interface, etc.). The segmentation interface may be substantially similar to segmentation interface 200, described in detail with reference to FIGS. 3-4.

Each of the multiple cohort groups may be displayed in the segmentation interface with information pertaining to the cohort group. For example, the segmentation interface may include a number of user devices in each cohort group or a percentage of user devices in each cohort group. The percentage may be relative to the total number of user devices represented in the set of behavioral data, relative to a total number of user devices having a shared behavior metric (e.g., date of first launch, etc.), or relative to any other set or subset of user devices as may be specified or customized by a user. The percentage or number may be displayed as a numerical indicator (e.g., "32.01%"), a color or color shading (e.g., darker colors indicating higher numbers/percentages), or any other indicator of the number or percentage of user devices in a particular cohort group. Advantageously, the segmentation interface may display each of the multiple cohort groups as a selectable icon, thereby facilitating user selection of one or more cohort groups.

Still referring to FIG. 8, process 400 is shown to include receiving a user selection of one or more of the cohort groups presented via the segmentation interface (step 408). A user may select one or more of the multiple cohort groups through the segmentation interface by clicking, highlighting, checking, or otherwise selecting one or more of the cohort groups. By selecting one or more of the cohort groups, a user may identify a subset of user devices (e.g., the user devices included in the selected cohort groups), a subset of applications (e.g., applications associated with user devices included in the selected cohort groups), and/or a subset of content items (e.g., content items associated with user devices included in the selected cohort groups).

A user may select one or more of the multiple cohort groups using a user interface device (e.g., a keyboard, a mouse, a microphone, a touch-sensitive display, etc.). The user interface device may allow the user to interact with the data structures stored within the memory of data management system 114. Selecting one or more of the multiple cohort groups may cause the selected data structures (e.g., the data structures corresponding to the selected cohort groups) to be modified, rearranged, marked, or otherwise indicated as being selected. The modification may be displayed visually to a user through the segmentation interface presented via a user interface device.

Still referring to FIG. 8, process 400 is shown to include defining, by the processing circuit, a custom segment of the behavioral data in response to the user selection (step 410). The custom segment may include the identified user devices and/or behavioral data associated with the identified user devices. For implementations in which the cohort groups include content items or applications rather than user devices, a user may identify a subset of content items or applications by selecting one or more of the cohort groups. The custom segment may include the identified content items, applications, and/or behavioral data associated with the identified content items or applications.

In some implementations, the custom segment may be actively defined by custom segment definition module 135. Custom segment definition module 135 may interact with the data structures representing the behavioral data and/or cohort groups (e.g., using processing circuit 118) and rearrange, copy, extract, or otherwise identify specific data structures for inclusion in the custom segment. Custom segment definition module 135 may temporarily store the identified data structures in a local memory of data management system 114 for further processing.

Still referring to FIG. 8, process 400 is shown to include storing an indication of the custom segment in a non-volatile data storage device (step 412). The indication of the custom segment may be an index, a range, a list of user devices, or any other specification of the subset of the behavioral data included in the custom segment. In some implementations, the indication of the custom segment may be the actual data included in the custom segment. The data storage device may be local to data management system 114 (e.g., memory 122) or a remote data storage device (e.g., data storage devices 112, a data storage device local to application developers 104, etc.). Advantageously, the indication of the custom segment may be stored such that it may be retrieved and applied as a data filter in generating a subsequent analytical report.

In some implementations, step 412 may be performed by segment storage module 136. Segment storage module 136 may receive data structures representing the defined custom segment from custom segment definition module 135. Segment storage module 136 may copy the identified data structures to the non-volatile data storage device for permanent or semi-permanent storage. In some implementations, segment storage module 136 may create an index or other identifier of the data included in the custom segment without copying the actual segment data. For example, segment storage module 136 may create a directory, index, or other identifier which specifies the particular data structures included in the custom segment. In some implementations, segment storage module may store the indication of the custom segment in the non-volatile data storage device in place of or in addition to the actual segment data.

Figure 9:
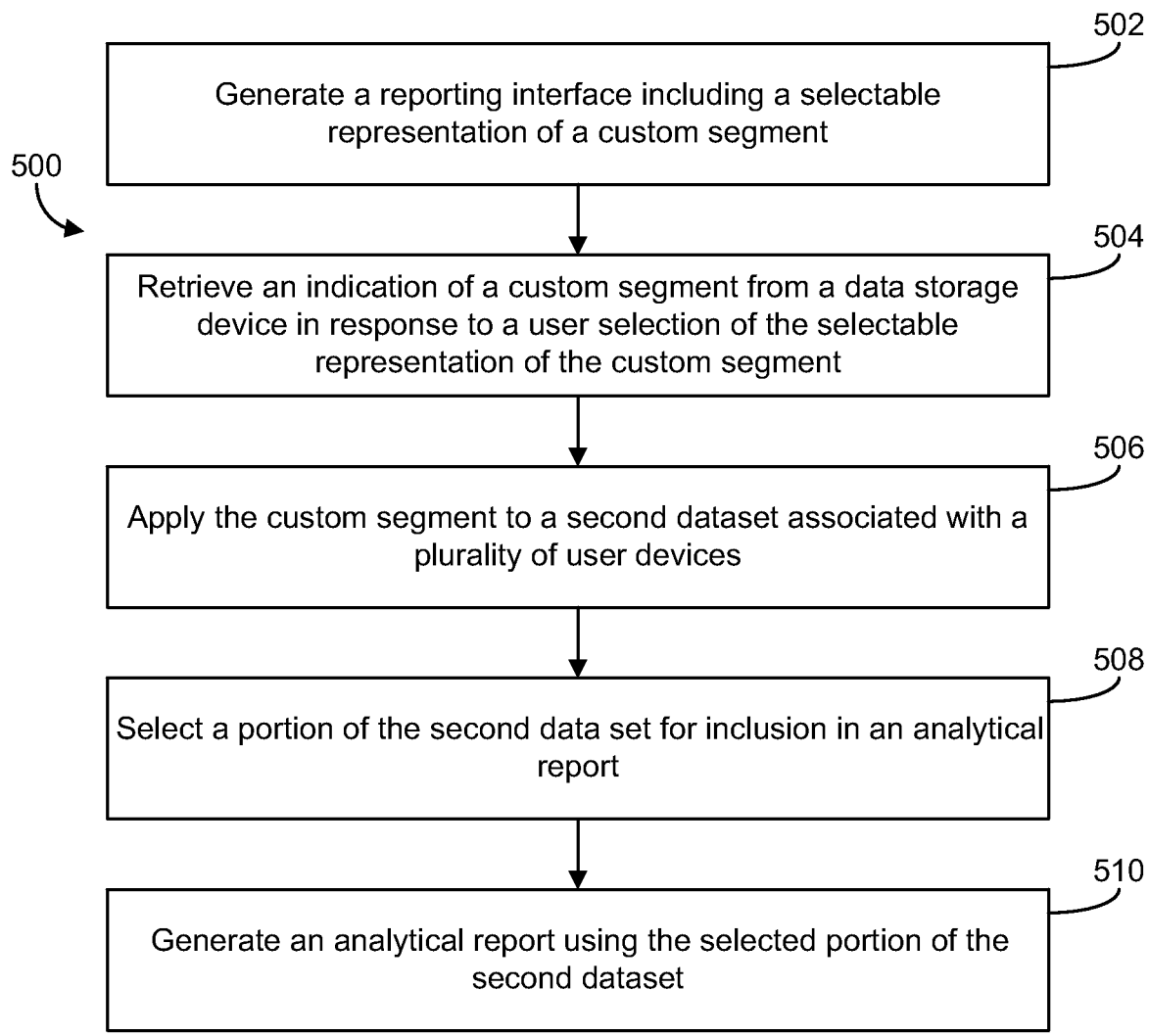
FIG. 9 is a flowchart of a process for applying the custom segment as a data filter and generating an analytical report, according to a described implementation.

Referring now to FIG. 9, a flowchart of a process 500 for retrieving and using a custom segment to generate an analytical report is shown, according to a described implementation. In some implementations, process 500 may be performed after performing process 400. Process 500 may be performed by reporting interface modules 137 of data management system 144. Reporting interface modules 137 may access the custom segment data structures (or data structures identifying separate custom segment data) stored in the non-volatile data storage device by segment storage module 136. Reporting interface modules 137 may use the custom segment data to identify a portion (e.g., some or all) of data in a second data set. Reporting interface modules 137 may then use the identified portion of data to generate an analytical report.

Process 500 is shown to include generating a reporting interface including a selectable representation of a custom segment (step 502). The selectable representation of the custom segment may be an icon displaying a name of the custom segment as may be specified (e.g., via dialog box 278) when defining the custom segment. In some implementations, the reporting interface is separate from the segmentation interface. The structure and appearance of the reporting interface may be defined by data stored within reporting interface modules 137. Processing circuit 118 may retrieve the data structures defining the appearance and functionality of the reporting interface from a memory device of data management system 114 and analyze the data structures to generate the reporting interface. The reporting interface may be presented (e.g., to a user) via a user interface device.

Still referring to FIG. 9, process 500 is shown to include retrieving an indication of a custom segment from a data storage device in response to a user selection of the selectable representation of the custom segment (step 504). Step 504 may involve receiving a user input (e.g., from a user via a user input device) identifying a particular custom segment for retrieval. Step 504 may further involve accessing the data storage device in which the indication of the custom segment was previously stored (e.g., in step 412). Retrieving the indication of the custom segment may include copying the indication of the custom segment the non-volatile memory of the data storage device to the working memory (e.g., RAM) of data management system 114.

Still referring to FIG. 9, process 500 is shown to include applying the custom segment to a second dataset associated with a plurality of user devices (step 506). In some implementations, the second dataset may be the same set of behavioral data used in process 400 (e.g., to identify the cohort groups and define the custom segment). In other implementations, the second dataset may include some of the same behavioral data used in process 400 and some additional data. The additional data may be additional behavioral data received from user devices after the custom segment was defined or other data received from other sources. The additional data may be associated with some of the same user devices included in the identified cohort groups and/or additional user devices not included in the identified cohort groups. In further implementations, the second dataset may be a set of third-party data including none of the behavioral data used in process 400. The third-party data may pertain to some or all of the same user devices included in the identified cohort groups or to different user devices. The second dataset may include behavioral data, non-behavioral data, or a combination of behavioral and non-behavioral data. The custom segment may be applicable to some or all of the available data.

Still referring to FIG. 9, process 500 is shown to include selecting a portion of the second dataset for inclusion in an analytical report (step 508). The custom segment (or indication thereof) may be used to filter data from the second dataset prior to generating the analytical report. For example, the custom segment may identify a plurality of user devices. In some implementations, selecting a portion of the second dataset includes selecting only the data (e.g., in the second dataset) associated with the user devices identified by the custom segment. In other implementations, selecting a portion of the second dataset includes removing data associated with the identified user devices from the second dataset. As another example, the custom segment may identify a plurality of content items or applications. Selecting a portion of the second dataset includes selecting or removing data associated with the identified content items and/or applications from the second dataset.

In some implementations, step 508 includes selecting the entirety of the second dataset. In other words, the selected portion of the second dataset may include all the data in the second dataset. The entirety of the second dataset may be selected when the custom segment is applicable to the whole set of data available.

In some implementations, selecting a portion of the second dataset may cause the selected data structures (e.g., the data structures corresponding to the selected portion) to be modified, rearranged, marked, or otherwise indicated as being selected. In some implementations, reporting interface modules 137 may copy or move the selected portion to a different portion of the memory device in which the second dataset is stored or to a different data storage device. The selected portion of the second dataset may be displayed visually to a user through the reporting interface presented via a user interface device.

Still referring to FIG. 9, process 500 is shown to include generating an analytical report using the selected portion of the second dataset (step 510). The analytical report may analyze any metric included in the second dataset. Advantageously, the analytical report may analyze a metric other than the behavior metric used in process 400 to identify the multiple cohort groups and define the custom segment. This functionality allows process 500 to produce analytical reports assessing a second behavior metric for only the user devices selected during process 400. In some implementations, the analytical report analyzes the entirety of the data in the second dataset (e.g., when the custom segment is applicable to all the available data).

In some implementations, analytical report module 139 uses the selected portion of the second dataset to produce the analytical report. Analytical report module 139 may retrieve the data structures representing the selected portion from the memory device in which they are stored and process the selected data structures (e.g., using processor 120). Analytical report module 139 may process the selected data structures according to processing instructions stored in analytical report module 139.

Figure 10:
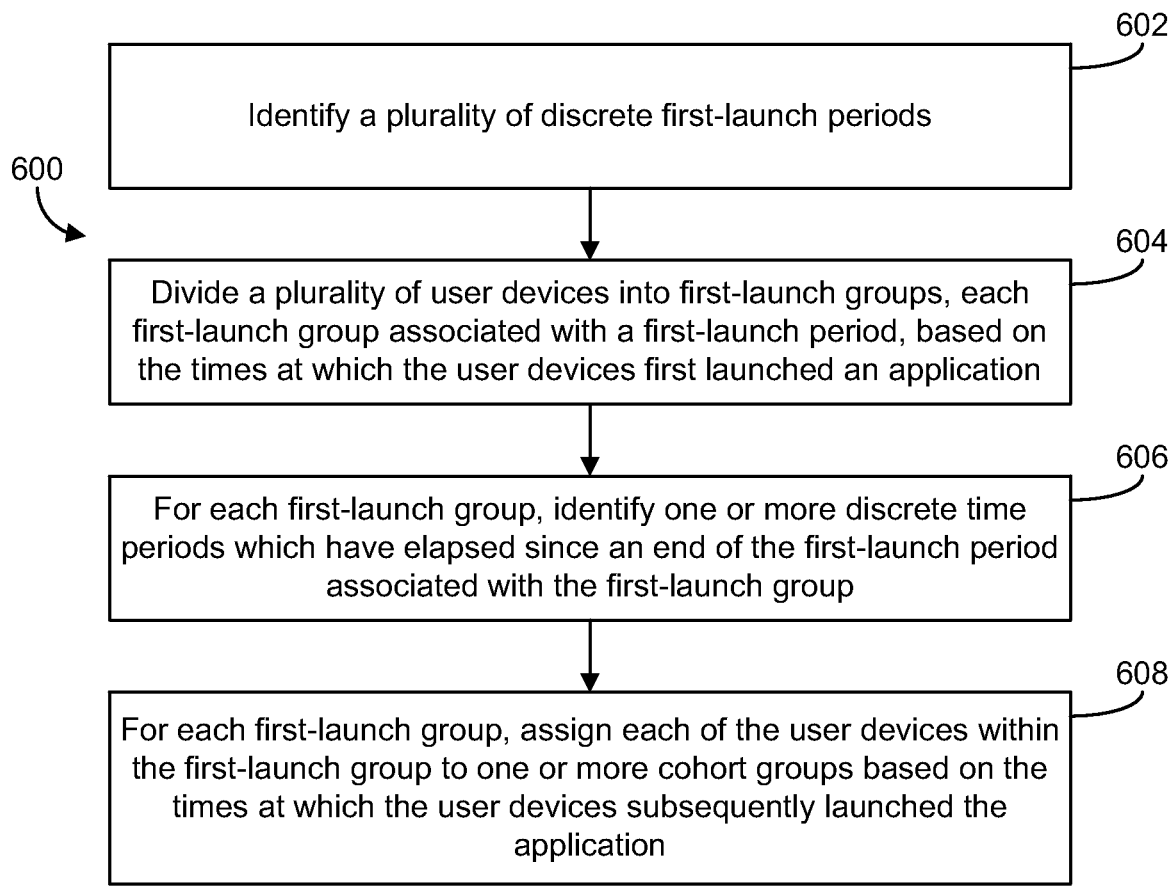
FIG. 10 is a flowchart of a process for identifying multiple cohort groups in a set of behavioral data, the process of FIG. 10 providing a specific example of how the processes of FIGS. 8-9 may be used to create a cohort-based retention report, according to a described implementation.

Referring now to FIG. 10, a flowchart of a process 600 for identifying multiple cohort groups is shown, according to a described implementation. Process 600 may be a specific implementation of step 404 and may be used in the generation of cohort-based retention reports. Process 600 can be performed to answer the question "for all user devices which first launched an application within time period X, how many of them subsequently launched the application Y days/weeks later?"

Process 600 is shown to include identifying a plurality of discrete first-launch periods (step 602) and dividing a plurality of user devices into first-launch groups based on the times at which the user devices first launched an application (step 604). Each first-launch group may be associated with one of the first-launch periods and a user device may be assigned to a first-launch group if the time at which the user device first launched the application occurred during the first-launch period associated with the first-launch group.

In some implementations, steps 602 and 604 may be performed by cohort identification module 134. Identifying a plurality of discrete first-launch periods and dividing a plurality of user devices into first-launch groups may involve actively reorganizing data structures within a memory device. For example, cohort identification module 134 may access the behavioral data from a memory device in which the behavioral data is stored. The behavioral data may be represented by data structures associated with the plurality of user devices. Cohort identification module 134 may arrange the data structures according to the first-launch behavior metric and store the rearranged data structures in the same or different memory device.

Process 600 is shown to further include, for each first-launch group, identifying one or more discrete time periods which have elapsed since an end of the first-launch period associated with the first-launch group (step 606) and assigning each of the user devices within the first-launch group to one or more cohort groups based on the times at which the user devices subsequently launched the application (step 608). Each cohort group may be associated with one of the discrete time periods and a user device may be assigned to a cohort group if the user device launched the application during the discrete time period associated with the cohort group. A user device may be assigned to more than one cohort group if the user device subsequently launched the application during multiple discrete time periods subsequent to the first-launch period associated with the user device.

In some implementations, identifying the one or more discrete time periods involves creating a data structure within a memory device of data management system 114. Cohort identification module 134 may create one or more data structures (e.g., representing the one or more identified time periods) and store the data structures in the memory device. Assigning each of the user devices to one or more cohort groups may include modifying the data structures associated with the plurality of user devices. Cohort identification module may modify the data structures according to the cohort group(s) to which the associated user devices are assigned. For example, cohort identification module 134 may cause the associated data structures (e.g., the data structures corresponding to the selected cohort groups) to be modified, rearranged, marked, or otherwise indicated as being assigned to a particular cohort group. The modification may be displayed visually to a user through the segmentation interface presented via a user interface device.

Implementations of the subject matter and the operations described in this specification may be implemented in digital electronic circuitry, or in computer software, firmware, or hardware, including the structures disclosed in this specification and their structural equivalents, or in combinations of one or more of them. Implementations of the subject matter described in this specification may be implemented as one or more computer programs, i.e., one or more modules of computer program instructions, encoded on one or more computer storage medium for execution by, or to control the operation of, data processing apparatus. Alternatively or in addition, the program instructions may be encoded on an artificially-generated propagated signal (e.g., a machine-generated electrical, optical, or electromagnetic signal) that is generated to encode information for transmission to suitable receiver apparatus for execution by a data processing apparatus. A computer storage medium may be, or be included in, a computer-readable storage device, a computer-readable storage substrate, a random or serial access memory array or device, or a combination of one or more of them. Moreover, while a computer storage medium is not a propagated signal, a computer storage medium may be a source or destination of computer program instructions encoded in an artificially-generated propagated signal. The computer storage medium may also be, or be included in, one or more separate components or media (e.g., multiple CDs, disks, or other storage devices). Accordingly, the computer storage medium is both tangible and non-transitory.

The operations described in this disclosure may be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application-specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD-ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc.) by which the user may provide input to the computer. Other kinds of devices may be used to provide for interaction with a user as well; for example, feedback provided to the user may be any form of sensory feedback (e.g., visual feedback, auditory feedback, or tactile feedback), and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

Implementations of the subject matter described in this disclosure may be implemented in a computing system that includes a back-end component (e.g., as a data server), or that includes a middleware component (e.g., an application server), or that includes a front-end component (e.g., a client computer) having a graphical user interface or a web browser through which a user may interact with an implementation of the subject matter described in this disclosure, or any combination of one or more such back-end, middleware, or front-end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

While this specification contains many specific implementation details, these should not be construed as limitations on the scope of any disclosures or of what may be claimed, but rather as descriptions of features specific to particular implementations of particular disclosures. Certain features that are described in this disclosure in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products embodied on one or more tangible media.

The features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services (e.g., Netflix, Vudu, Hulu, etc.), a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

Thus, particular implementations of the subject matter have been described. Other implementations are within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An automated computer-implemented method for defining a custom segment in a set of behavioral data, the method comprising:
 receiving, at a processing circuit, a set of behavioral data associated with a plurality of user devices, the behavioral data including a behavior metric for each of the user devices, wherein the behavioral data includes retention data for each of the plurality of user devices, the retention data for each user device comprising:
  a first behavior metric indicating a time at which the user device first launched an application, the time of first launch occurring within a first time period; and
  a second behavior metric indicating whether the user device launched the application during one or more time periods subsequent to the first time period;
 identifying, by the processing circuit, multiple cohort groups, each of the cohort groups including one or more of the user devices, the cohort groups are identified based on the behavior metric for each of the user devices, wherein identifying the multiple cohort groups includes:
  identifying a plurality of discrete first-launch periods;
  dividing the plurality of user devices into first-launch groups, wherein each first-launch group is associated with one of the first-launch periods and wherein a user device is assigned to a first-launch group if the time at which the user device first launched the application occurred during the first-launch period associated with the first-launch group; and
  for each first-launch group:
   identifying one or more discrete time periods which have elapsed since an end of the first-launch period associated with the first-launch group, and
   assigning each of the user devices within the first-launch group to one or more cohort groups, wherein each cohort group is associated with one of the discrete time periods and wherein a user device is assigned to a cohort group if the user device launched the application during the discrete time period associated with the cohort group;
  generating, by the processing circuit, a segmentation interface including a graphical visualization of the multiple cohort groups and causing the segmentation interface to be presented via a user interface device, each of the cohort groups in the segmentation interface is presented as a selectable icon;
  receiving a user selection of one or more of the cohort groups by receiving a selection of one or more of the selectable icons presented via the segmentation interface;
  defining, by the processing circuit, a custom segment of the behavioral data in response to the user selection, the custom segment is a subset of the behavioral data and is associated with a subset of the user devices; and
  storing an indication of the custom segment in a non-volatile data storage device.

2. The method of claim 1, further comprises:
 generating a reporting interface separate from the segmentation interface and causing the reporting interface to be presented via a user interface device, the reporting interface including a selectable representation of the custom segment;

retrieving the indication of the custom segment from the data storage device in response to a user selection of the selectable representation of the custom segment;

applying the custom segment to a second dataset associated with a plurality of user devices;

selecting a portion of the second dataset for inclusion in an analytical report, wherein the portion of the second dataset is selected based on the application of the custom segment; and generating an analytical report using the selected portion of the second dataset, wherein the analytical report analyzes a behavior metric other than the behavior metric used to identify the cohort groups.

3. The method of claim 2, wherein the second dataset is one or more of:
the set of behavioral data received at the processing circuit;
a set of behavioral data including some of the behavioral data received at the processing circuit and some additional behavioral data; and
a set of third-party behavioral data including none of the behavioral data received at the processing circuit.

4. The method of claim 1, wherein the set of behavioral data received at the processing circuit is received from the plurality of user devices.

5. The method of claim 1, wherein the behavioral data includes multiple behavior metrics for each of the user devices, the method further comprising:
receiving a customizable user selection of a first behavior metric, wherein the multiple cohort groups are defined using the first behavior metric.

6. The method of claim 5, further comprising:
receiving a customizable user selection of a second behavior metric, wherein the multiple cohort groups are defined using both the first behavior metric and the second behavior metric.

7. A data management system for defining a custom segment in a set of behavioral data, the data management system comprising a processing circuit configured to:
receive a set of behavioral data associated with a plurality of user devices, the behavioral data including a behavior metric for each of the user devices, wherein the behavioral data includes retention data for each of the plurality of user devices, the retention data for each user device comprising:
a first behavior metric indicating a time at which the user device first launched an application, the time of first launch occurring within a first time period; and
a second behavior metric indicating whether the user device launched the application during one or more time periods subsequent to the first time period;
identify multiple cohort groups, each of the cohort groups including one or more of the user devices, the cohort groups are identified based on the behavior metric for each of the user devices, wherein identifying the multiple cohort groups includes:
identifying a plurality of discrete first-launch periods;
dividing the plurality of user devices into first-launch groups, wherein each first-launch group is associated with one of the first-launch periods and wherein a user device is assigned to a first-launch group if the time at which the user device first launched the application occurred during the first-launch period associated with the first-launch group; and
for each first-launch group:
identifying one or more discrete time periods which have elapsed since an end of the first-launch period associated with the first-launch group, and
assigning each of the user devices within the first-launch group to one or more cohort groups, wherein each cohort group is associated with one of the discrete time periods and wherein a user device is assigned to a cohort group if the user device launched the application during the discrete time period associated with the cohort group;
generate a segmentation interface including a graphical visualization of the multiple cohort groups and cause the segmentation interface to be presented via a user interface device, each of the cohort groups in the segmentation interface is presented as a selectable icon;
receive a user selection of one or more of the cohort groups by receiving a selection of one or more of the selectable icons presented via the segmentation interface;
define a custom segment of the behavioral data in response to the user selection, the custom segment is a subset of the behavioral data and is associated with a subset of the user devices; and
store an indication of the custom segment in a non-volatile data storage device.

8. The data management system of claim 7, wherein the processing circuit is further configured to:
generate a reporting interface separate from the segmentation interface and cause the reporting interface to be presented via a user interface device, the reporting interface including a selectable representation of the custom segment;
retrieve the indication of the custom segment from the data storage device in response to a user selection of the selectable representation of the custom segment;
apply the custom segment to a second dataset associated with a plurality of user devices;
select a portion of the second dataset for inclusion in an analytical report, wherein the portion of the second dataset is selected based on the application of the custom segment; and
generate an analytical report using the selected portion of the second dataset, wherein the analytical report analyzes a behavior metric other than the behavior metric used to identify the cohort groups.

9. The data management system of claim 8, wherein the second dataset is one or more of:
the set of behavioral data received at the processing circuit;
a set of behavioral data including some of the behavioral data received at the processing circuit and some additional behavioral data; and
a set of third-party behavioral data including none of the behavioral data received at the processing circuit.

10. The data management system of claim 7, wherein the set of behavioral data received at the processing circuit is received from the plurality of user devices.

11. The data management system of claim 7, wherein the behavioral data includes multiple behavior metrics for each of the user devices, wherein the processing circuit is further configured to:
receive a user selection of a first customizable behavior metric, wherein the multiple cohort groups are defined using the first behavior metric.

12. The data management system of claim 11, wherein the processing circuit is further configured to:
receive a user selection of a second customizable behavior metric, wherein the multiple cohort groups are defined using both the first behavior metric and the second behavior metric.

13. One or more non-transitory computer-readable media having instructions stored therein, the instructions being executable by one or more processors to cause the one or more processors to perform operations comprising:
receiving a set of behavioral data associated with a plurality of user devices, the behavioral data including a behavior metric for each of the user devices, wherein the behavioral data includes retention data for each of the plurality of user devices, the retention data for each user device comprising:
a first behavior metric indicating a time at which the user device first launched an application, the time of first launch occurring within a first time period; and
a second behavior metric indicating whether the user device launched the application during one or more time periods subsequent to the first time period;
identifying multiple cohort groups, each of the cohort groups including one or more of the user devices, the cohort groups are identified based on the behavior metric for each of the user devices, wherein identifying the multiple cohort groups includes:
identifying a plurality of discrete first-launch periods;
dividing the plurality of user devices into first-launch groups, wherein each first-launch group is associated with one of the first-launch periods and wherein a user device is assigned to a first-launch group if the time at which the user device first launched the application occurred during the first-launch period associated with the first-launch group; and
for each first-launch group:
identifying one or more discrete time periods which have elapsed since an end of the first-launch period associated with the first-launch group, and assigning each of the user devices within the first-launch group to one or more cohort groups, wherein each cohort group is associated with one of the discrete time periods and wherein a user device is assigned to a cohort group if the user device launched the application during the discrete time period associated with the cohort group;
generating a segmentation interface including a graphical visualization of the multiple cohort groups and causing the segmentation interface to be presented via a user interface device, each of the cohort groups in the segmentation interface is presented as a selectable icon;
receiving a user selection of one or more of the cohort groups by receiving a selection of one or more of the selectable icons presented via the segmentation interface;
defining a custom segment of the behavioral data in response to the user selection, the custom segment is a subset of the behavioral data and is associated with a subset of the user devices; and
storing an indication of the custom segment in a non-volatile data storage device.

14. The non-transitory computer-readable media of claim 13, wherein the instructions stored therein further cause the one or more processors to perform operations comprising:
generating a reporting interface separate from the segmentation interface and causing the reporting interface to be presented via a user interface device, the reporting interface including a selectable representation of the custom segment;
retrieving the indication of the custom segment from the data storage device in response to a user selection of the selectable representation of the custom segment;
applying the custom segment to a second dataset associated with a plurality of user devices;
selecting a portion of the second dataset for inclusion in an analytical report, wherein the portion of the second dataset is selected based on the application of the custom segment; and
generating an analytical report using the selected portion of the second dataset, wherein the analytical report analyzes a behavior metric other than the behavior metric used to identify the cohort groups.

* * * * *